(12) United States Patent
Makuta et al.

(10) Patent No.: US 7,798,814 B2
(45) Date of Patent: Sep. 21, 2010

(54) RIDING SIMULATION SYSTEM

(75) Inventors: Yohei Makuta, Saitama (JP); Kyohei Ueda, Saitama (JP); Yukio Miyamaru, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 914 days.

(21) Appl. No.: 10/772,430

(22) Filed: Feb. 6, 2004

(65) Prior Publication Data

US 2004/0198522 A1    Oct. 7, 2004

(30) Foreign Application Priority Data

Feb. 14, 2003 (JP) .............................. 2003-036412
Feb. 14, 2003 (JP) .............................. 2003-036527
Feb. 14, 2003 (JP) .............................. 2003-036751
Feb. 14, 2003 (JP) .............................. 2003-037303

(51) Int. Cl.
G09B 9/04 (2006.01)

(52) U.S. Cl. .......................................... 434/61; 434/29

(58) Field of Classification Search ................. 434/29, 434/61, 71; 463/6, 36; 310/81; 273/148 B; 703/8; 340/425.5, 456, 457
See application file for complete search history.

(56) References Cited

U.S. PATENT DOCUMENTS

| | | | | | |
|---|---|---|---|---|---|
| 4,199,264 | A | * | 4/1980 | Uebel .......................... | 366/123 |
| 4,293,231 | A | * | 10/1981 | Lyle ............................ | 366/120 |
| 4,589,532 | A | * | 5/1986 | Ito et al. ....................... | 477/81 |
| 4,637,605 | A | | 1/1987 | Ritchie | |
| 4,727,765 | A | * | 3/1988 | Schneider ................. | 74/473.28 |
| 4,995,280 | A | * | 2/1991 | Tagawa ..................... | 74/480 R |
| 5,050,587 | A | * | 9/1991 | Sagara et al. .................. | 601/2 |
| 5,203,563 | A | * | 4/1993 | Loper, III ............... | 273/148 B |
| 5,364,271 | A | * | 11/1994 | Aknin et al. .................. | 434/61 |
| 5,415,550 | A | * | 5/1995 | Aoki et al. ..................... | 434/61 |
| 5,431,569 | A | * | 7/1995 | Simpkins et al. .............. | 434/29 |
| 5,533,899 | A | * | 7/1996 | Young .......................... | 434/61 |
| 5,547,382 | A | * | 8/1996 | Yamasaki et al. ............. | 434/61 |
| 5,989,123 | A | * | 11/1999 | Tosaki et al. .................. | 463/37 |
| 6,083,106 | A | * | 7/2000 | McDowell .................... | 463/46 |

(Continued)

FOREIGN PATENT DOCUMENTS

DE    2931565 A1    2/1981

(Continued)

*Primary Examiner*—Kathleen Mosser
*Assistant Examiner*—Peter R Egloff
(74) *Attorney, Agent, or Firm*—Birch, Stewart, Kolasch & Birch, LLP

(57) ABSTRACT

A riding simulation system for providing an operator with a pseudo-experience of a running motorcycle. A steering handle mechanism of the system which enables the operator to perform steering operations is turnably held on a frame body and a connection shaft is supported to be inclinable relative to the frame body through an inclination lock mechanism. The connection shaft is provided to be extendable and contractable along the axial direction thereof through an extension/contraction lock mechanism, so that the position of a pedal mechanism mounted on the lower side of the connection shaft can be displaced to a desired position relative to the position of the steering handle mechanism. The system also includes a vibrator and a click generator to simulate the vibration of a motor and the sound of gear shifting, as well as a mechanism to simulate a reaction force to a steering handle.

18 Claims, 20 Drawing Sheets

U.S. PATENT DOCUMENTS

| | | | |
|---|---|---|---|
| 6,122,991 A * | 9/2000 | Clarkson | 74/551.8 |
| 6,133,657 A * | 10/2000 | Semenik et al. | 310/81 |
| 6,210,165 B1 | 4/2001 | Sugimori | |
| 6,225,975 B1 | 5/2001 | Furuki et al. | |
| 6,234,800 B1 | 5/2001 | Koyama et al. | |
| 6,236,306 B1 * | 5/2001 | Liebelt | 340/407.1 |
| 6,522,037 B2 * | 2/2003 | Lee et al. | 310/68 R |
| 7,156,026 B2 * | 1/2007 | McClellion | 108/43 |
| 7,264,099 B2 * | 9/2007 | Duignan | 192/43.1 |
| 2001/0008849 A1 | 7/2001 | Komata | |

FOREIGN PATENT DOCUMENTS

| | | | |
|---|---|---|---|
| GB | 2298835 A | | 9/1996 |
| JP | 61077569 A | | 4/1986 |
| JP | HEI-5-23095 U | | 3/1993 |
| JP | 05088605 A | | 4/1993 |
| JP | 2002-113264 A | | 4/2002 |
| JP | 2002-311811 A | | 10/2002 |
| JP | 3587634 B2 * | | 11/2004 |
| WO | WO 01/29646 A1 | | 4/2001 |

* cited by examiner

RIDING SIMULATION SYSTEM

CROSS-REFERENCE TO RELATED APPLICATION

The present application claims priority under 35 U.S.C. §119 to Japanese Patent Application Nos. 2003-036412 filed Feb. 14, 2003, Japanese 2003-037303, filed Feb. 14, 2003, 2003-036751, filed Feb. 14, 2003, and 2003-036527, filed Feb. 14, 2003, the entire contents of which are hereby incorporated by reference.

BACKGROUND OF THE INVENTION

1. Field of the Invention

The present invention relates to a riding simulation system for providing an operator with a pseudo-experience of a running condition of a motorcycle by displaying scenery seen to the rider as a visual image on a display based on an operating condition of operation by the operator.

2. Description of Background Art

Hitherto, riding simulation systems for providing an operator with a pseudo-experience of running conditions of a motorcycle by displaying various running conditions on a display in response to various operations performed by the operator have been adopted for the purpose of a play, an education of operation of the motorcycle, or the like.

For example, a riding simulation system served to play has a structure in which a steering handle shaft portion extending toward the upper side of a base member having a lower surface formed to be a roughly flat surface shape is provided, and steering handles extending leftwards and rightwards are disposed at a top portion of the steering handle shaft portion.

In addition, the steering handles are fitted respectively with a right lever functioning as a brake lever for a front wheel and a left lever for a clutch changeover operation, and an accelerating operation of the motorcycle displayed on the display is effected through a right grip for acceleration which is provided turnably at a right end portion of the steering handles.

With the riding simulation system mounted on a flat surface such as a floor, the player grips the steering handles, turns the steering handles with the steering handle shaft portion as a center according to the operating condition, or turns the right grip as required to effect an accelerating operation of the motorcycle displayed on the display for play, or operates the right lever and the left lever to effect deceleration, and performs gear change operations, whereby the player gets a pseudo-experience of operations of the motorcycle displayed on the display for play (see, for example, Japanese Patent Laid-open No. 2002-113264 (paragraphs [0010] to [0021]).

Meanwhile, an actual motorcycle is provided, on the lower side of a roughly central portion thereof, with a foot brake pedal operated by the rider through his foot, and a gear change pedal for gear change operations which is displaced upwards or downwards by the rider through his foot.

In the riding simulation system according to Japanese Patent Laid-open No. 2002-113264, only the steering handles, the right lever functioning as the brake lever for the front wheel, and the left lever for clutch changeover operations are provided; namely, a foot brake pedal and a gear change pedal for performing a gear change operation when displaced upwards or downwards by the rider through his foot are not provided.

In view of the above, it is assumed that a pedal unit (not shown) comprising a foot brake pedal and a gear change pedal is provided on the floor surface or the like independently from the steering handle for the purpose of obtaining an operating feeling more similar to that on an actual motorcycle. Based on the assumption, however, an operation of kicking the gear change pedal upwards is needed in raising the gear change gear ratio. In this case, the pedal unit itself mounted on the floor surface or the like is lifted up from the floor surface or the like by this operation, resulting in that it is difficult for the player to perform stable operations.

In addition, there is a request for getting pseudo-experiences of running conditions of various vehicle forms of motorcycles by use of a single riding simulation system.

In addition, conventionally there has been developed a riding simulation system in which a dummy motorcycle and a display are combined with each other, a screen display is varied according to operations on a steering handle and an accelerator, and a dummy engine sound is generated, thereby providing the operator with a pseudo-experience of running conditions.

In such a riding simulation system, in order to further enhance the ambience, there has been proposed a system in which a motor for a dummy engine vibration is mounted to an end portion of the steering handle, and the rotating speed of the motor is controlled according to the rotating speed of a dummy engine, thereby generating dummy vibrations (see, for example, Japanese Patent Laid-open No. Hei 5-23095 (paragraph [0039], FIG. 14).

In this case, the motor for the dummy engine vibration is desirably so constituted that it is easy to replace and repair at the time of maintenance or the like. On the other hand, since the motor is a means, which vibrates in itself, the motor must be securely fixed so as not to generate a needless chatter other than the dummy vibration.

Further, Japanese Patent Laid-open No. Hei 5-88605 (paragraph [0028], FIG. 14) has proposed a motorcycle riding simulation system in which the light emitted from a video apparatus is not shielded by the operator and which provides an image easy to see for the operator (see Patent Reference 1).

A mimic motorcycle constituting the riding simulation system disclosed in Japanese Patent Laid-open No. Hei 5-88605 has a structure in which a gear change mechanism including a change pedal is provided, and a gear change switch (sensor) for detecting that a shift-down or shift-up has been performed by a displacement motion through the change pedal is provided additionally.

Namely, with the gear change switch energized or de-energized under a displacement action of the change pedal, it is detected that a gear change such as a shift-up or a shift-down has been performed.

Meanwhile, in the riding simulation system disclosed in Japanese Patent Laid-open No. Hei 5-88605, a gear change made by operating the change pedal results only in that the gear change switch is pressed; therefore, the click feeling at the time of a gear change in an actual motorcycle cannot be obtained, and the operating feeling at the time of a gear change in the riding simulation system is far from that in the actual motorcycle.

Still further In view of the above, Japanese Patent Laid-open No. Hei 5-88605(paragraph [0020], FIG. 9) has proposed a motorcycle riding simulation system in which the light emitted from a video apparatus is not shielded by the operator and which provides an image easy to see for the operator A mimic motorcycle in the riding simulation system disclosed in Japanese Patent Laid-open No. Hei 5-88605 (paragraph [0020], FIG. 9) is provided with a steering handle moving motor for applying to a steering handle a reaction force corresponding to an operation of the steering handle by the operator, and is so constructed that a steering handle operating feeling similar to that on an actual motorcycle can be obtained.

Meanwhile, in the industry, there is a request for a structure in which the above-mentioned steering handle moving motor is replaced by a simple mechanism. To meet the request, therefore, it may be contemplated to generate a reaction force when the steering handle is turned rightwards or leftwards, by use of two coil springs for a steering handle shaft for turnably supporting the steering handle. This approach, however, has the problem that a large space is required for mounting the two coil springs.

On the other hand, when it is planned to generate both leftward and rightward reaction forces by use of a single coil spring, a gap is generated between the coil spring and the steering handle shaft, resulting in the generation of chatter.

SUMMARY AND OBJECTS OF THE INVENTION

The present invention has been made in consideration of the above-mentioned problems and the like.

Accordingly, a first object of the present invention is to provide a riding simulation system with which more stabler operations can be achieved and which permits the operator to get pseudo-experiences of running conditions of various vehicle forms of motorcycles.

In order to attain the above object, a first aspect of the present invention provides a riding simulation system for providing an operator with a pseudo-experience of running conditions of a motorcycle by displaying scenery seen to the rider as a video image on a display based on the operating condition of operation by the operator, the riding simulation system comprising a steering handle mechanism gripped and operated by the operator, a step mechanism comprising a brake pedal and a gear change pedal which are operated by the feet of the operator, a connection shaft for connecting the steering handle mechanism and the step mechanism to each other, the connection shaft provided to be extendable and contractable along the axial direction thereof, and support means for supporting the steering handle mechanism or the connection shaft.

According to the first aspect of the present invention, the steering handle mechanism and the step mechanism are integrally connected to each other through the extendable and contractable connection shaft, and the steering handle mechanism or the connection shaft is supported by the support means. Therefore, when the riding simulation system is installed, a lower end portion of the connection shaft is brought into contact with and restricted by a floor surface or the like by extending or contracting the connection shaft.

Accordingly, even when the brake pedal or the gear change pedal is operated by the operator, the steering handle mechanism and the step mechanism of the riding simulation system are not displaced attendant on the operation, so that the operator can always operate stably the brake pedal and the gear change pedal.

Besides, with the connection shaft provided to be inclinable relative to the steering handle mechanism or the step mechanism, the inclination angle of the connection shaft can be set to an arbitrary angle according to the vehicle forms of various motorcycles differing in the position of the step mechanism. As a result, the operator can get pseudo-experiences of running conditions of various vehicle forms of motorcycles differing in the position of the step mechanism relative to the position of the steering handle mechanism.

A second object of the present invention is to provide a riding simulation system which has a small number of component parts, is easy to maintain, and permits the operator to experience dummy vibrations with an extremely high ambience.

In order to attain the second object, a second aspect of the present invention provides a riding simulation system including a vibrator for a dummy engine vibration in a steering handle mechanism and providing an operator with a pseudo-experience of a running condition of a motorcycle by generating a vibration based on the operating condition by the operator. The riding simulation system includes a taper surface portion formed at an inner circumferential surface of a steering handle pipe constituting the steering handle mechanism, the taper surface portion gradually decreasing in diameter from the side of an end portion of the steering handle pipe, and a bracket having an engaging portion for engagement with the end portion of the steering handle pipe, having an outer circumferential surface gradually decreasing in diameter from the side of the engaging portion, and being inserted into the taper surface portion while holding the vibrator.

In this case, the outer circumferential surface decreasing in diameter of the bracket holding the vibrator is inserted into the taper surface portion formed at the inner circumferential surface of the end portion of the steering handle pipe, and the engaging portion at the end portion of the bracket is engaged with the end portion of the steering handle pipe, whereby the vibrator is fixed.

In addition, according to the second aspect of the present invention, there is provided a riding simulation system including a vibrator for a dummy engine vibration in a steering handle mechanism and providing an operator with a pseudo-experience of a running condition of a motorcycle by generating a vibration based on the operating condition by the operator. The riding simulation system includes a bracket screw-engaged with an end portion of a steering handle pipe constituting the steering handle mechanism. The vibrator is inserted into the inside of the steering handle pipe in the state of being held by the bracket.

In this case, the vibrator is fixed through the bracket, which is screw-engaged with the steering handle pipe.

Furthermore, the second aspect of the present invention provides a riding simulation system including a vibrator for a dummy engine vibration in a steering handle mechanism and providing an operator with a pseudo-experience of a running condition of a motorcycle by generating a vibration based on the operating condition by the operator.

The vibrator is inserted and held in the inside of one end portion of a steering handle pipe constituting the steering handle mechanism, and a predetermined gap is formed between an outer circumferential portion of the one end portion of the steering handle pipe and a steering handle grip attached to the outer circumferential portion.

In this case, since the gap is formed between the steering handle pipe and the steering handle grip, the vibration generated by the single vibrator is effectively transmitted to both end portions of the steering handle grip without being attenuated. Incidentally, when the steering handle grip is a throttle grip, a gap can be easily formed between the steering handle pipe and the throttle grip. Besides, when the steering handle pipe is composed of a single communicating pipe, the vibration can be securely transmitted to the whole part of the steering handle pipe by using only the single vibrator mounted to the steering handle grip side.

A third object of the present invention is to provide a riding simulation system in which a pseudo-click feeling at the time of a gear change is generated with a simple mechanism, whereby the operating feeling at the time of a gear change in the riding simulation system can be made to be similar to that in an actual motorcycle.

In order to attain the third object, a third aspect the present invention provides a riding simulation system for providing an operator with a pseudo-experience of running conditions of a motorcycle by displaying scenery seen to the rider as a video image on a display based on an operating condition upon an operation by the operator and detecting a gear change by a sensor provided at a gear change pedal, the riding simulation system including click generating means for generating a click feeling similar to a gear change in an actual motorcycle when a gear change is made by operating the gear change pedal.

According to the third aspect of the present invention, when a gear change is made by operating the gear change pedal, the click generating means generates a click sound, for example, a "click", and a vibration similar to that at the time of a gear change in an actual motorcycle. Therefore, the operator can get a pseudo-click feeling at the time of a gear change, and the operating feeling at the time of a gear change in the riding simulation system can be made to be similar to that in the actual motorcycle.

In this case, the click generating means has a simple mechanism including a ball member, and a hole portion in which the ball member is engaged when the gear change pedal is in a center position. When a gear change is made by operating the gear change pedal, the ball member is released from the hole portion and thereafter again engaged in the hole portion, whereby a click sound and a vibration are generated.

A fourth object of the present invention is to provide a riding simulation system in which reaction forces can be applied to a steering handle respectively when the steering handle is turned leftwards and rightwards, by use of a single spring, without generating chatter at the steering handle.

In order to attain the fourth object, a fourth aspect of the present invention provides a riding simulation system for providing an operator with a pseudo-experience of running conditions of a motorcycle by displaying scenery seen to the rider as a video image on a display based on an operating condition of a dummy operating mechanism operated by the operator, the riding simulation system including a handle mechanism for operating a steering handle with a steering handle shaft portion as a turning fulcrum by the operator, a frame portion for supporting the steering handle shaft portion, and a single spring for applying a reaction force in a direction opposite to the turning direction of the steering handle when the steering handle is operated. The single spring is provided with a pair of clamping portions projected outwards from the handle shaft portion so as to clamp the frame portion therebetween.

According to the fourth aspect of the present invention, the single spring comprising the pair of clamping portions projected outwards from the handle shaft portion so as to clamp the frame portion therebetween is provided so that, when the steering handle is operated, the single spring applies a reaction force in a direction opposite to the turning direction of the steering handle. Therefore, generation of chatter at the steering handle is obviated, and the reaction force can be generated by a simple mechanism.

In this case, with elastic members interposed between the pair of clamping portions of the spring and the frame portion, generation of gaps between the clamping portions and the frame portion is obviated, generation of a chatter due to such gaps can be prevented securely, and it is possible to operate the steering handle with a feeling more similar to that on an actual motorcycle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
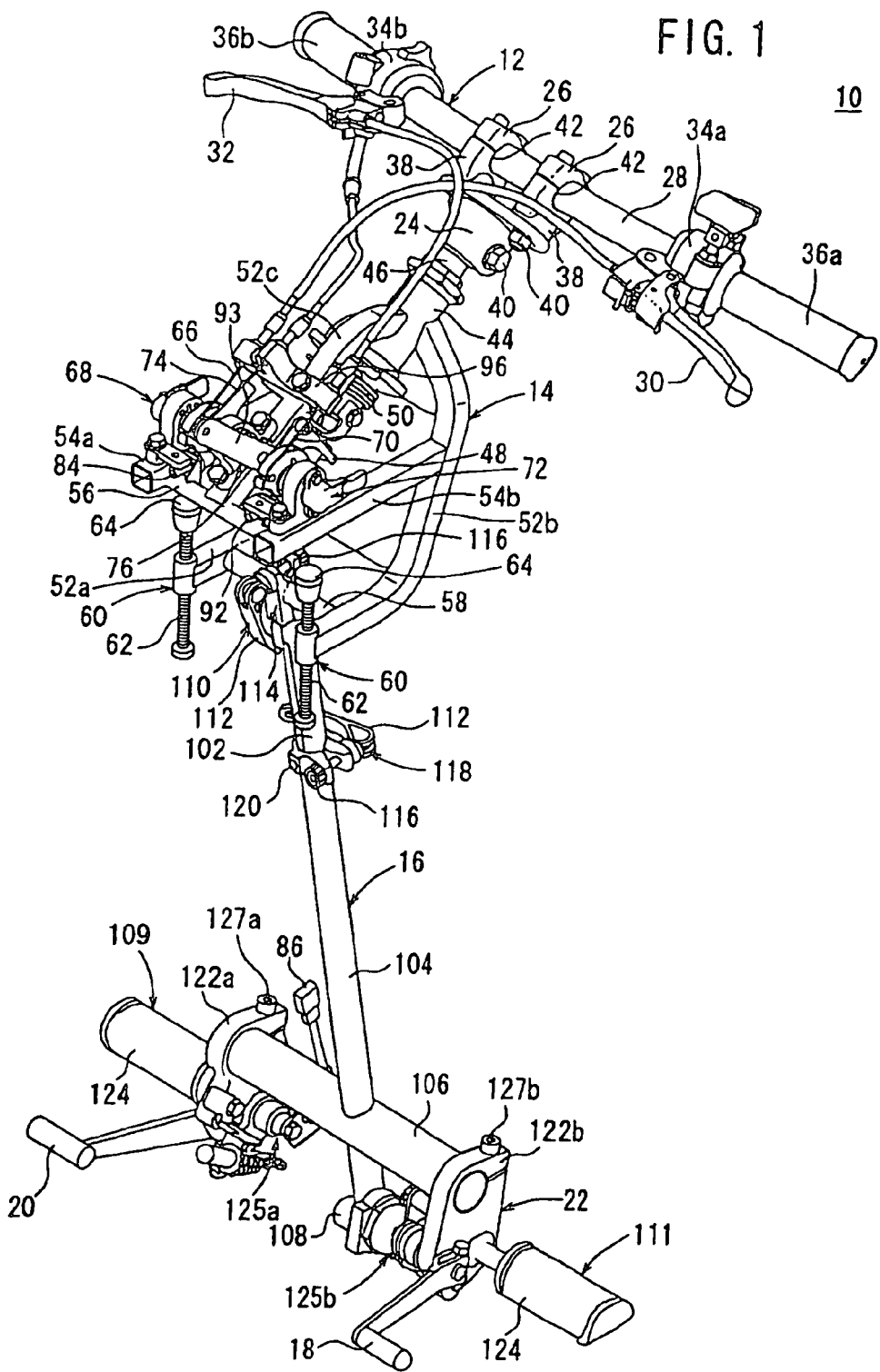
FIG. 1 is a perspective view of a riding simulation system according to an embodiment of the present invention.

FIGS. 1 to 4 show the riding simulation system 10 according to the embodiment of the present invention.

The riding simulation system 10 (hereinafter referred to simply as the simulation system 10) is comprised of a steering handle mechanism 12 which is gripped by an operator 133 (see FIGS. 5 to 8) and which is for steering a front wheel of a motorcycle displayed on a display 128 described later, a frame body 14 for turnably holding the steering handle mechanism 12, a connection shaft 16 supported inclinably relative to the frame body 14 and provided to be extendable and contractable, and a pedal mechanism 22 disposed at a lower end portion of the connection shaft 16 and comprising a gear change pedal 18 and a brake pedal 20.

The steering handle mechanism 12 is comprised of a steering stem 24 (see FIG. 3) having an upper portion formed in a roughly fan-like shape, an elongate steering handle 28 integrally held on the steering stem 24 through a holder 26, lever joint portions 34a and 34b through which a clutch lever 30 and a brake lever 32 are held on the steering handle 28, and left and right grips 36a and 36b covered with rubber or the like which are mounted respectively to end portions of the steering handle 28.

The steering stem 24 is provided at its upper end portion with a roughly fan-like mount surface, to which a pair of mount flanges 38 are connected roughly in parallel through bolts 40 in such a manner as to project upwards. The mount flanges 38 are each provided with a semi-circular recessed portion 42 corresponding to the outside diameter of the steering handle 28.

In addition, a lower end portion of the steering stem 24 is integrally connected, through a bolt 40, to an upper end portion of a stem member 46 inserted in a cylindrical portion 44 of the frame body 14. The upper end portion of the stem member 46 is thus connected with the steering stem 24, whereas a lower end portion of the stem member 46 inserted in the cylindrical portion 44 of the frame body 14 is inserted in a hole portion (not shown) formed in a roughly central portion of a bracket 48 connected to the frame body 14. Namely, the stem member 46 is turnably supported by the cylindrical portion 44 and the hole portion of the bracket 48.

Furthermore, a spring 50 for such an urging as to ensure that the steering handle 28 connected to the stem member 46 is constantly located in a center position is provided between the stem member 46 and the bracket 48.

The steering handle 28 is formed in a cylindrical shape from a pipe material or the like, and both end portions of the steering handle 28 are bent at predetermined angles toward the rear side of the simulation system 10.

A left end portion of the steering handle 28, as viewed in a direction toward the front side of the simulation system 10, is fitted with a left grip 36a covered with rubber or the like. Similarly, a right end portion of the steering handle 28 is fitted with a right grip 36b formed of rubber or the like. The right grip 36b functions as a throttle grip for performing an accelerating operation in the motorcycle displayed on the display 128 when it is rotated toward the operator 133 (see FIGS. 5 to 8) by the operator 133.

Roughly central portions of the steering handle 28 are mounted in the recessed portions 42 (see FIG. 1) of the mount flanges 38. With the pair of holders 26 mounted from upper portions of the mount flanges 38 and fastened with the bolts 40, the steering handle 28 is clamped between the mount flanges 38 and the holders 26 and is integrally fixed to the steering stem 24.

Furthermore, at positions spaced from both end portions of the steering handle 28 toward a roughly central portion of the steering handle 28 by a predetermined length, the annular lever joint portions 34a and 34b are disposed in the manner of surrounding the steering handle 28.

The lever joint portion 34a is disposed on the left side of the steering handle 28. The lever joint portion 34a is integrally fitted with the clutch lever 30 on the front side of the simulation system 10.

The clutch lever 30 is shaft-supported so as to be turnable relative to the lever joint portion 34a. With the clutch lever 30 gripped toward the steering handle 28 when a gear changing operation for gears is performed by the operator 133 (see FIGS. 5 to 8), a clutch in the motorcycle displayed on the display 128 is disconnected, resulting in the condition where a gear changing operation can be performed with the gear change pedal 18 described later.

Incidentally, the clutch lever 30 is disposed only in the case of a motorcycle provided with a manual transmission; in the case of a motorcycle provided with an automatic transmission, a brake lever is disposed in place of the clutch lever 30.

Besides, the lever joint portion 34b disposed on the right side of the steering handle 28 is integrally fitted with the brake lever 32 on the front side of the simulation system 10, similarly.

The brake lever 32 is shaft-supported so as to be turnable relative to the lever joint portion 34b. With the brake lever 32 gripped toward the steering handle 28 by the operator 133, the front wheel of the motorcycle displayed on the display 128 is set into a braked condition.

The frame body 14 is comprised of three, first to third main frames 52a, 52b, and 52c connected at equal angular intervals from the cylindrical portion 44 in which the stem member 46 is inserted, a pair of sub-frames 54a and 54b connected to roughly central portions of the first and second main frames 52a and 52b so as to extend toward the front side of the simulation system 10, a cross frame 56 for connection between tip end portions of the sub-frames 54a and 54b, and a connection frame 58 which connects the first and second main frames 52a and 52b to each other and of which a roughly central portion inclinably supports the connection shaft 16 through an inclination lock mechanism 110. The connection frame 58 is disposed so as to position below the cross frame 56 in parallel with each other.

The first to third main frames 52a to 52c are disposed at equal angular intervals, with the cylindrical portion 44 as a center, and the two, first and second main frames 52a and 52b disposed to be symmetrical in the left and right directions from the cylindrical portion 44 extend downwards while being curved. Tip end portions extending on the lower side of the two, first and second main frames 52a and 52b are formed to be roughly horizontal, and the tip end portions are provided with stopper mechanisms 60 for fixing the frame body 14 to a flat-surfaced table 130 or the like.

The stopper mechanism 60 is provided roughly orthogonally to the first and second main frames 52a and 52b, and is comprised of a pair of fixing bolts 62 screw-engaged with tip end portions of the first and second main frames 52a and 52b, and holding portions 64 formed to be enlarged radially outwards at upper end portions of the fixing bolts 62. Incidentally, top faces of the holding portions 64 are formed to be roughly flat. By turning the fixing bolts 62 screw-engaged with the first and second main frames 52*a* and 52*b*, the fixing bolts 62 are vertically displaced along the axial direction thereof.

In addition, the third main frame 52*c* disposed between the two, first and second main frames 52*a* and 52*b* in the cylindrical portion 44 is curved downwards from the cylindrical portion 44, to be connected to the cross frame 56.

A first detection unit 68 moved in conjunction with a clutch wire 66 through the clutch lever 30 so as to detect the grip amount of the clutch lever 30 is disposed at the top face of the sub-frame 54*a* on one side which is connected to the first main frame 52*a*.

In addition, a second detection unit 72 moved in conjunction with a brake wire 70 through the brake lever 32 so as to detect the grip amount of the brake lever 32 is disposed at the top face of the sub-frame 54*b* on the other side which is connected to the second main frame 52*b*.

Furthermore, a throttle opening angle detection unit 76 for detecting the opening (turning amount) of the right grip 36*b* mounted to the steering handle 28 through a throttle wire 74 is disposed at the top face of the third main frame 52*c* connected to the cross frame 56.

Figure 3:
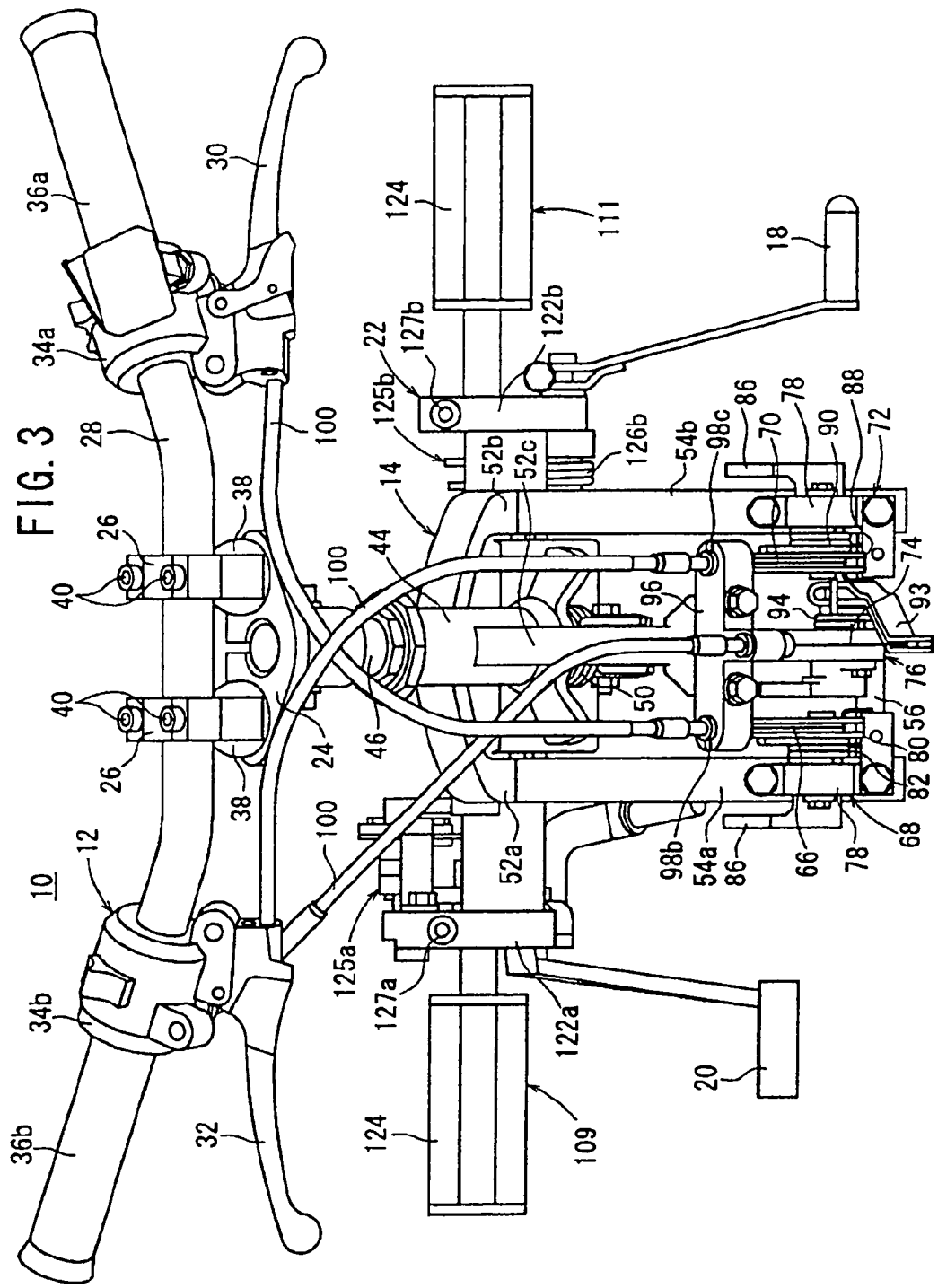
FIG. 3 is a plan view of the riding simulation system shown in FIG. 1.
Figure 4:
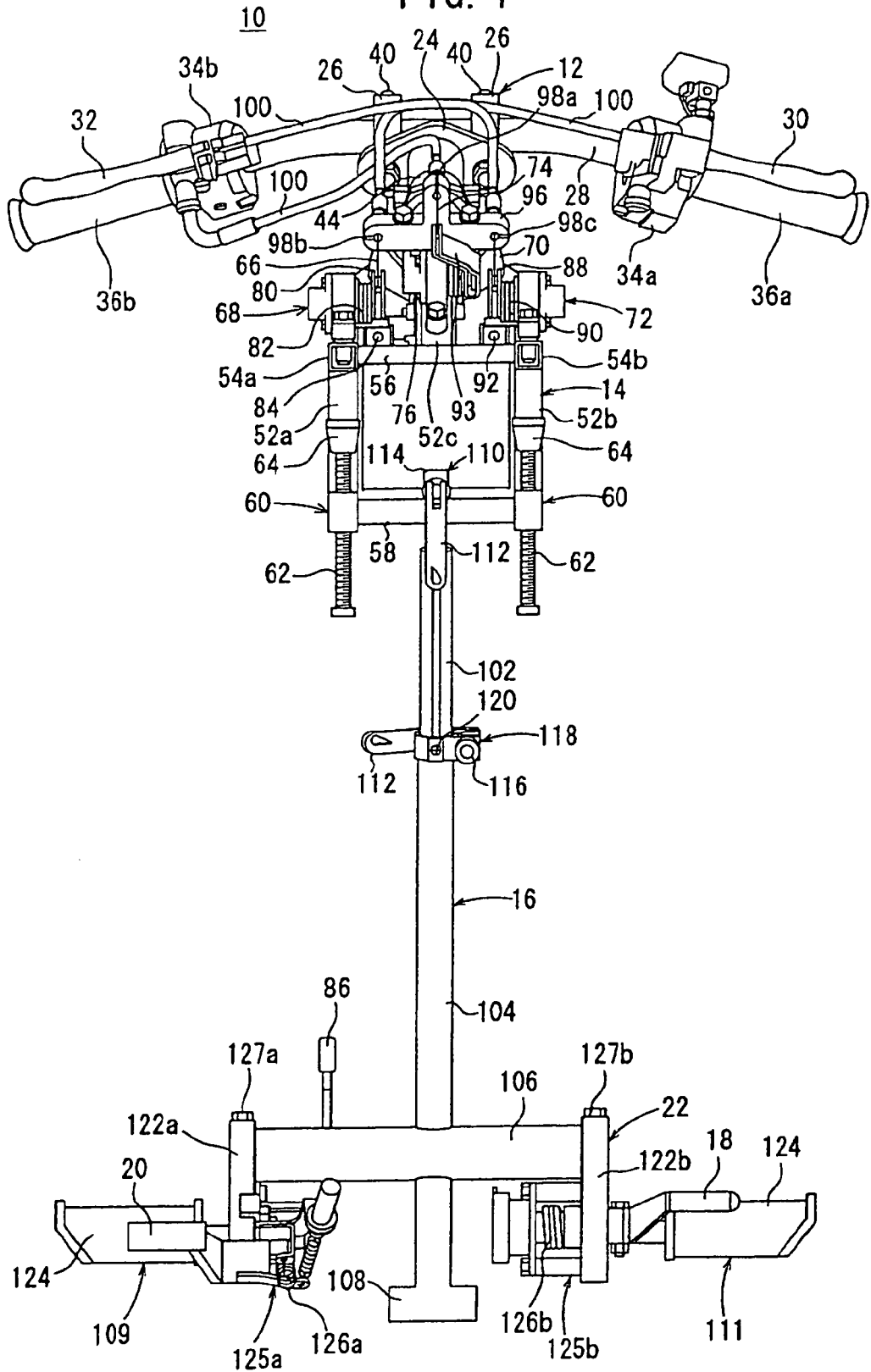
FIG. 4 is a front view of the riding simulation system shown in FIG. 1.

As shown in FIG. 3, the first detection unit 68 is comprised of a detection unit main body 78 fixed to the sub-frame 54*a* through bolts 40, a first rotative pulley 80 shaft-supported turnably relative to the detection unit main body 78, a first return spring 82 interposed between the detection unit main body 78 and the first rotative pulley 80, and a first stopper portion 84 (see FIGS. 1 and 4) for restricting the turning motion of the first rotative pulley 80.

The other end portion side of the clutch wire 66 having one end portion connected to the clutch lever 30 is connected to the first rotative pulley 80. The first return spring 82, by its springy force, applies a biasing force in the direction of pulling the clutch wire 66 connected to the first rotative pulley 80. A sensor (not shown) for detecting the turning amount of the first rotative pulley 80 is incorporated in the detection unit main body 78. The turning amount of the first rotative pulley 80 detected by the sensor is outputted as a detection signal to a control unit (not shown), through a connector 86 formed in the exterior of the detection unit main body 78.

Incidentally, the clutch lever 30 is set to be spaced apart from the steering handle 28, by the pulling of the clutch wire 66 connected to the first rotative pulley 80 under the action of the springy force of the first return spring 82. In other words, the clutch lever 30 is held in the state of being spaced by a predetermined spacing from the steering handle 28.

Like the first detection unit 68, the second detection unit 72 is comprised of a detection unit main body 78 fixed to the sub-frame 54*b* through bolts 40, a second rotative pulley 88 shaft-supported turnably relative to the detection unit main body 78, a second return spring 90 interposed between the detection unit main body 78 and the second rotative pulley 88, and a second stopper portion 92 for restricting the turning motion of the second rotative pulley 88.

The other end portion side of a brake wire 70 having one end portion connected to the brake lever 32 is connected to the second rotative pulley 88. The second return spring 90, by its springy force, applies a biasing force in the direction of pulling the brake wire 70 connected to the second rotative pulley 88. A sensor (not shown) for detecting the turning amount of the second rotative pulley 88 is incorporated in the detection unit main body 78.

The turning amount of the second rotative pulley 88 detected by the sensor is outputted as a detection signal to the control unit (not shown), through a connector 86 formed in the exterior of the detection unit main body 78.

Incidentally, the brake lever 32 is set to be spaced apart from the steering handle 28, by the pulling of the brake wire 70 connected to the second rotative pulley 88 under the action of the springy force of the second return spring 90. In other words, the brake lever 32 is held in the state of being spaced by a predetermined spacing from the steering handle 28.

The throttle opening angle detection unit 76 has a structure in which one end portion side of a turning plate 93 is turnably shaft-supported through a detection unit main body 78 fixed to the third main frame 52*c* with bolts 40. A spring 94 for urging the turning plate 93 in the direction of spacing away from the cylindrical portion 44 is interposed between the turning plate 93 and the detection unit main body 78. In addition, the other end portion side of a throttle wire 74 having one end portion connected to the right grip 36*b* is connected to the other end portion side of the turning plate 93.

Furthermore, a cable stopper 96 for holding the clutch wire 66, the brake wire 70 and the throttle wire 74 is mounted onto the top face of the third main frame 52*c* through bolts 40, in the state of being spaced by a predetermined spacing from the throttle opening angle detection unit 76. The cable stopper 96 is formed in a roughly T shape in section, and has a structure in which the throttle wire 74 is inserted and held in a groove portion 98*a* formed in a roughly central portion of the cable stopper 96, and the clutch wire 66 connected to the clutch lever 30 is inserted and held in a groove portion 98*b* formed on the right side of the cable stopper 96.

In addition, the brake wire 70 connected to the brake lever 32 is inserted and held in a groove portion 98*c* formed on the left side of the cable stopper 96.

Incidentally, those portions of the clutch wire 66, the brake wire 70 and the throttle wire 74 which are located between the cable stopper 96 and the clutch lever 30, the brake lever 32 and the right grip 36*b* are each covered with a tubular cover tube 100.

The connection shaft 16 is formed to be elongate along the axial direction thereof, and is comprised of a first shaft portion 102 supported inclinably relative to the connection frame 58 in the frame body 14, a second shaft portion 104 in which the first shaft portion 102 is inserted and which is formed to be slightly larger in diameter than the first shaft portion 102, a step shaft 106 formed on the lower side of the second shaft portion 104 roughly orthogonally to the axis of the second shaft portion 104, and a support portion 108 formed at a lower end portion of the second shaft portion 104 roughly in parallel to the step shaft 106.

The inclination lock mechanism 110 for restricting and releasing an inclining motion of the connection shaft 16 relative to the connection frame 58 is provided at an upper end portion of the first shaft portion 102.

The inclination lock mechanism 110 is comprised of a fastening lever 112 having a screw portion and functioning for restricting and releasing the inclining motion of the connection shaft 16, a clamp 114 disposed at a position facing a side surface of the upper end of the first shaft 102, and a nut 116 screw-engaged with the screw portion of the fastening lever 112 passed through through-holes formed in the clamp 114 and an upper end portion of the first shaft portion 102. Namely, the connection frame 58 is clamped between the upper end portion of the first shaft portion 102 and the clamp 114.

With the connection shaft 16 clamping the connection frame 58 being inclined to a predetermined angle and with the fastening lever 112 being turned in a direction in which the outer circumferential surface of the first shaft portion 102 is pressed by the clamp 114, the spacing between the fastening lever 112 and the nut 116 is reduced under a screw-engaging action between the screw portion of the fastening lever 112 and the nut 116, and the outer circumferential surface of the connection frame 58 is pressed by the clamp 114. As a result, the inclining motion of the connection shaft 16 relative to the connection frame 58 is restricted.

On the other hand, the inside diameter of the second shaft portion 104 is formed to be roughly equal to or slightly larger than the outside diameter of the first shaft portion 102. Therefore, the first shaft portion 102 can be freely displaced inside the second shaft portion 104 along the axial direction of the second shaft portion 104.

In addition, an extension/contraction lock mechanism 118 for restricting and releasing the extending and contracting displacements of the first shaft portion 102 relative to the second shaft portion 104 by fastening the outer circumferential surface of the second shaft portion 104 radially inwards is provided at an upper end portion of the second shaft portion 104.

The extension/contraction lock mechanism 118 is comprised of a fastening lever 112 having a screw portion and functioning for restricting and releasing the extending and contracting displacements of the first shaft portion 102, a clamp 120 so mounted as to surround an upper end portion of the second shaft portion 104, and a nut 116 screw-engaged with the screw portion of the fastening lever 112 passed through a through-hole formed in the clamp 120.

Specifically, with the first shaft portion 102 displaced extendingly or contractingly upwards or downwards along the axial direction to a desired position under the condition of gripping the second shaft portion 104 and with the fastening lever 112 turned so as to cause the clamp 120 to press the outer circumferential surface of the second shaft portion 104 radially inwards, the spacing between the fastening lever 112 and the nut 116 is reduced under the screw-engaging action between the screw portion of the fastening lever 112 and the nut 116, and the outer circumferential surface of the second portion is pressed radially inwards, so that the extending or contracting displacement of the first shaft portion 102 relative to the second shaft portion 104 is restricted.

In other words, the overall length of the connection shaft 16 composed of the first and second shaft portions 102 and 104 can be regulated by the extension or contraction, and the connection shaft 16 can be fixed to an arbitrary length by restricting the extension or contraction of the connection shaft 16 by the extension/contraction lock mechanism 118.

In addition, the pedal mechanism 22 composed of the gear change pedal 18 operated by the operator 133 at the time of a gear change for gears and the brake pedal for performing a braking operation at the time of deceleration are provided at both end portions of the step shaft 106 formed on the lower side of the connection shaft 16.

Furthermore, the support portion 108 of the connection shaft 16 is formed to extend in an orthogonal direction by a predetermined length from a lower end portion of the second shaft portion 104. When the simulation system 10 is installed in a site, the support portion 108 is grounded on a floor surface 132 or the like, whereby the simulation system 10 can be installed securely in a further stabler installation condition.

The pedal mechanism 22 is comprised of a brake pedal unit 109 disposed on the right side of the step shaft 106, and a gear change pedal unit 111 disposed on the left side of the step shaft 106. Namely, the brake pedal unit 109 is provided on the side of the brake lever 32 in the steering handle mechanism 12, whereas the gear change pedal unit 111 is provided on the side of the clutch lever 30 in the steering handle mechanism 12.

The brake pedal unit 109 is comprised of a mount plate 122a connected to a right end portion of the step shaft 106 through a screw member, a step 124 projecting by a predetermined length in a direction of spacing away from the step shaft 106 of the mount plate 122a, the brake pedal 20 which is spaced by a predetermined spacing toward the front side of the simulation system 10 from the step 124 and which is turnably mounted to the mount plate 122a through a pin member, and a turning amount detection unit 125a which is mounted at a position facing the brake pedal 20 with the mount plate 122a therebetween and which detects the turning amount of the brake pedal 20.

The brake pedal 20 is formed in a roughly L shape, and is so mounted as to project toward the front side of the simulation system 10 through the pin member inserted in the mount plate 122. The brake pedal 20 is provided to be downwardly turnable with the pin member as a fulcrum, and a return spring 126a for applying an upward biasing force so as to constantly maintain the brake pedal 20 in a roughly horizontal state is interposed between one end portion shaft-supported by the pin member of the brake pedal 20 and the mount plate 122a.

Specifically, when the brake pedal 20 is stepped in downwards by the operator 133, the brake pedal 20 is turned with the one end portion shaft-supported by the pin member as a fulcrum against the springy force of the return spring 126a, and the turning amount of the brake pedal 20 is detected by the turning amount detection unit 125a. The turning amount of the brake pedal 20 detected by the turning amount detection unit 125a is outputted as a detection signal to the control unit (not shown) through a connector 86 connected to the turning amount detection unit 125a.

In addition, the gear change pedal unit 111 is comprised of a mount plate 122b connected to a left end portion of the step shaft 106 through a screw member, a step 124 projecting by a predetermined length in a direction of spacing away from the mount plate 122b, the gear change pedal 18 which is spaced by a predetermined spacing toward the front side of the simulation system 10 from the step 124 and which is provided turnably through the pin member attached to the mount plate 122b, and a turning amount detection unit 125b which is mounted at a position facing the gear change pedal 18 with the mount plate 122b therebetween and which detects the turning amount of the gear change pedal 18.

Incidentally, the mount plates 122a and 122b are fitted over the step shaft 106 through hole portions, and the mount plates 122a and 122b are fixed to the step shaft 106 through fixing screws 127a and 127b (see FIGS. 1 and 4) screwed to upper portions of the mount plates 122a and 122b. Namely, by loosening the fixing screws 127a and 127b, it is possible to rotate the mount plates 122a and 122b about the step shaft 106 as a center.

The gear change pedal 18 is formed in a roughly L shape, and is so mounted as to project toward the front side of the simulation system 10 through the pin member inserted through the mount plate 122. The gear change pedal 18 is provided to be turnable upwards and downwards with the pin member as a fulcrum, and a return spring 126b for applying a biasing force so as to constantly maintain the gear change pedal 18 in a roughly horizontal condition is interposed between one end portion shaft-supported by the pin member of the gear change pedal 18 and the mount plate 122.

Specifically, when the gear change pedal 18 is pulled upwards or stepped in downwards by the operator 133, the gear change pedal 18 is turned with the one end portion shaft-supported by the pin member as a fulcrum, and the turning amount of the gear change pedal 18 is detected by the turning amount detection unit 125b. The turning amount of the gear change pedal 18 detected by the turning amount detection unit 125b is outputted as a detection signal to the control unit (not shown) through a connector 86 connected to the turning amount detection unit 125b. Incidentally, a wire cable (not shown) connected to the connector 86 is contained in the inside of the connection shaft 16, whereby the wire cable is prevented from being exposed to the outside, and the wire cable can be prevented from breakage or the like.

The riding simulation system 10 according to the embodiment of the present invention is basically constituted as above. Next, operations and functions or effects of the riding simulation system 10 will be described below. First, a method of mounting the simulation system 10 to a table 130 (see FIGS. 5 and 6) or the like will be described.

Figure 5:
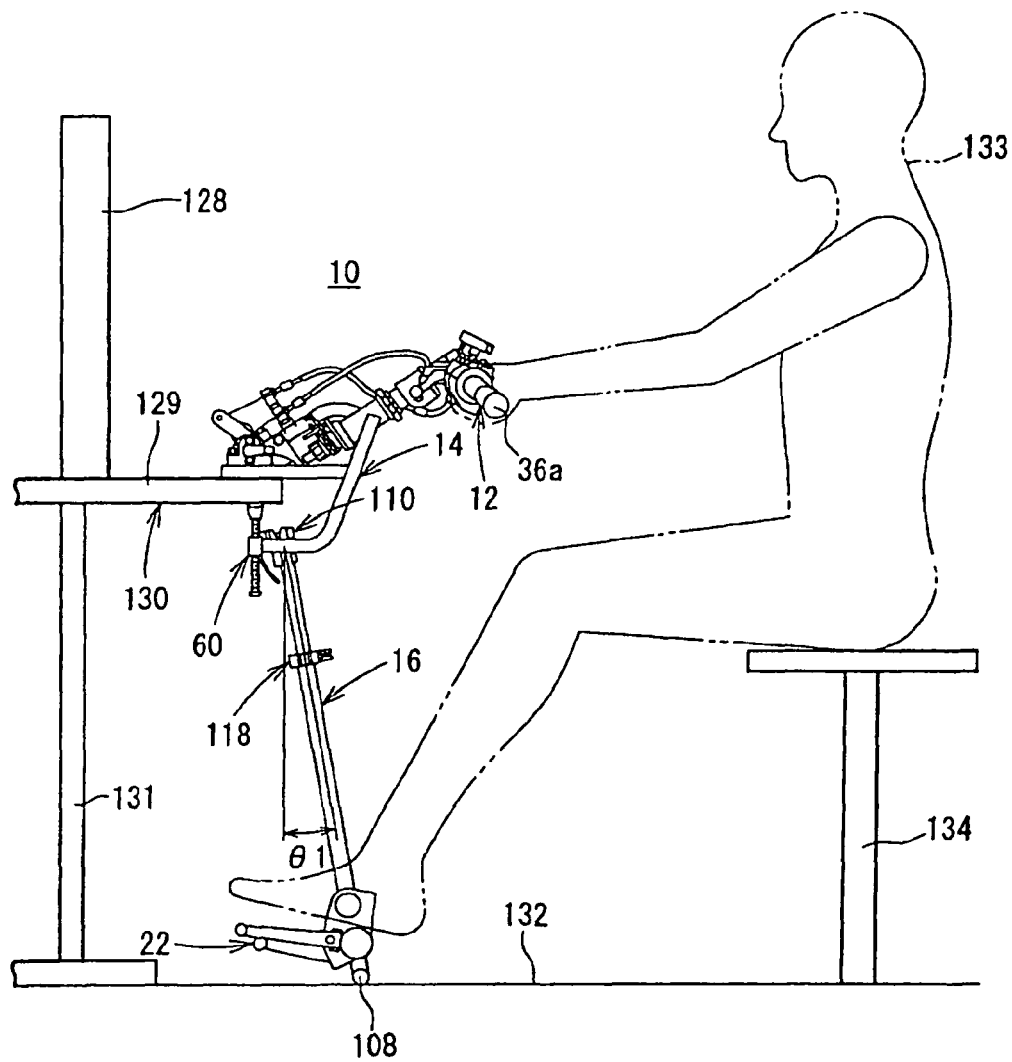
FIG. 5 is a side view showing the case where the riding simulation system shown in FIG. 1 is fixed on a table.
Figure 6:
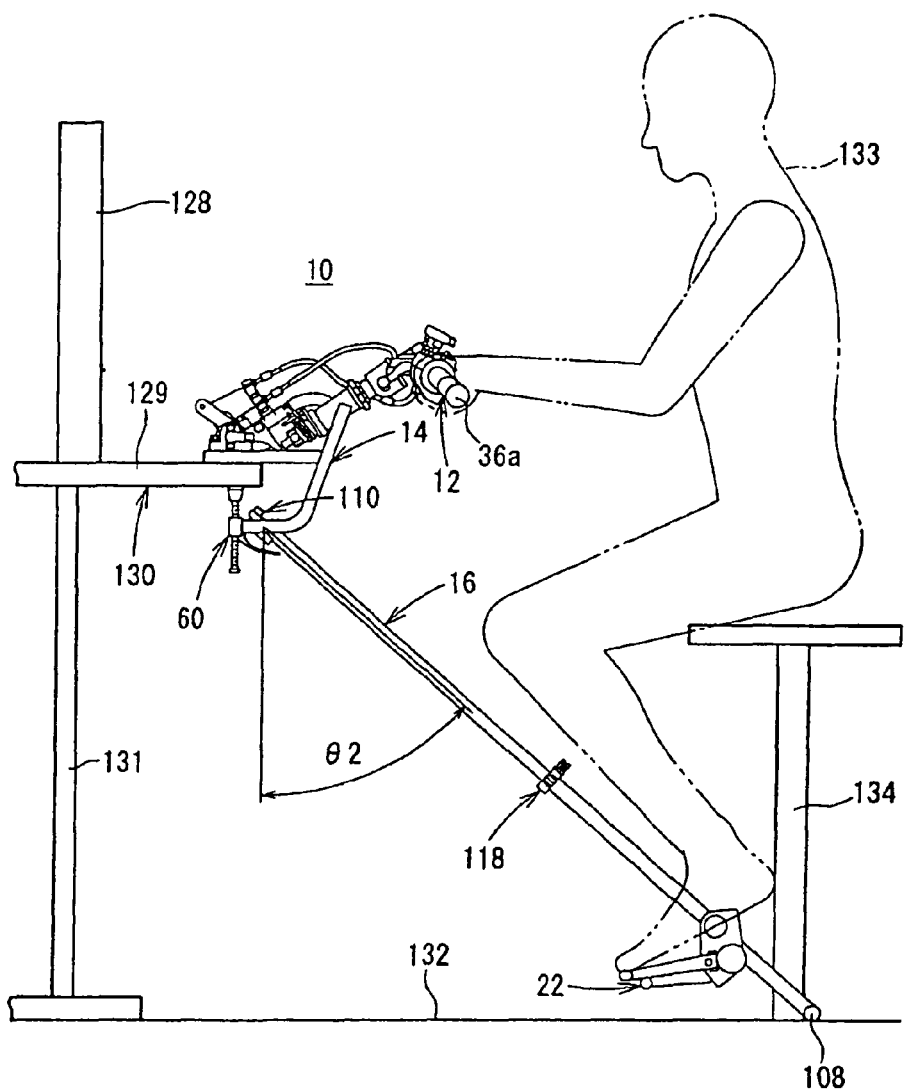
FIG. 6 is a side view showing the case where the riding simulation system shown in FIG. 1 is fixed on the table and a pedal unit is inclined by a predetermined angle to the operator side.

First, as for example shown in FIGS. 5 and 6, the lower surfaces of the pair of sub-frames 54a and 54b in the frame body 14 are seated on the top surface of a flat plate portion 129 of the flat-surfaced table 130 on which the display 128 is mounted. Then, the fixing bolts 62 of the stopper mechanisms 60 are turned to be displaced upwards, whereby the top faces of the holding portions 64 formed at the upper portions of the fixing bolts 62 are brought into contact with the lower surface of the table 130. As a result, the table 130 is clamped between the sub-frames 54a and 54b and the holding portions 64 of the stopper mechanisms 60. In other words, the simulation system 10 is easily fixed to the table 130 with the sub-frames 54a and 54b and the stopper mechanisms 60. Incidentally, as shown in FIGS. 5 and 6, the table 130 is disposed on a floor surface 132 or the like through leg portions 131 connected to the flat plate portion 129 and extending downwards roughly vertically.

Figure 2:
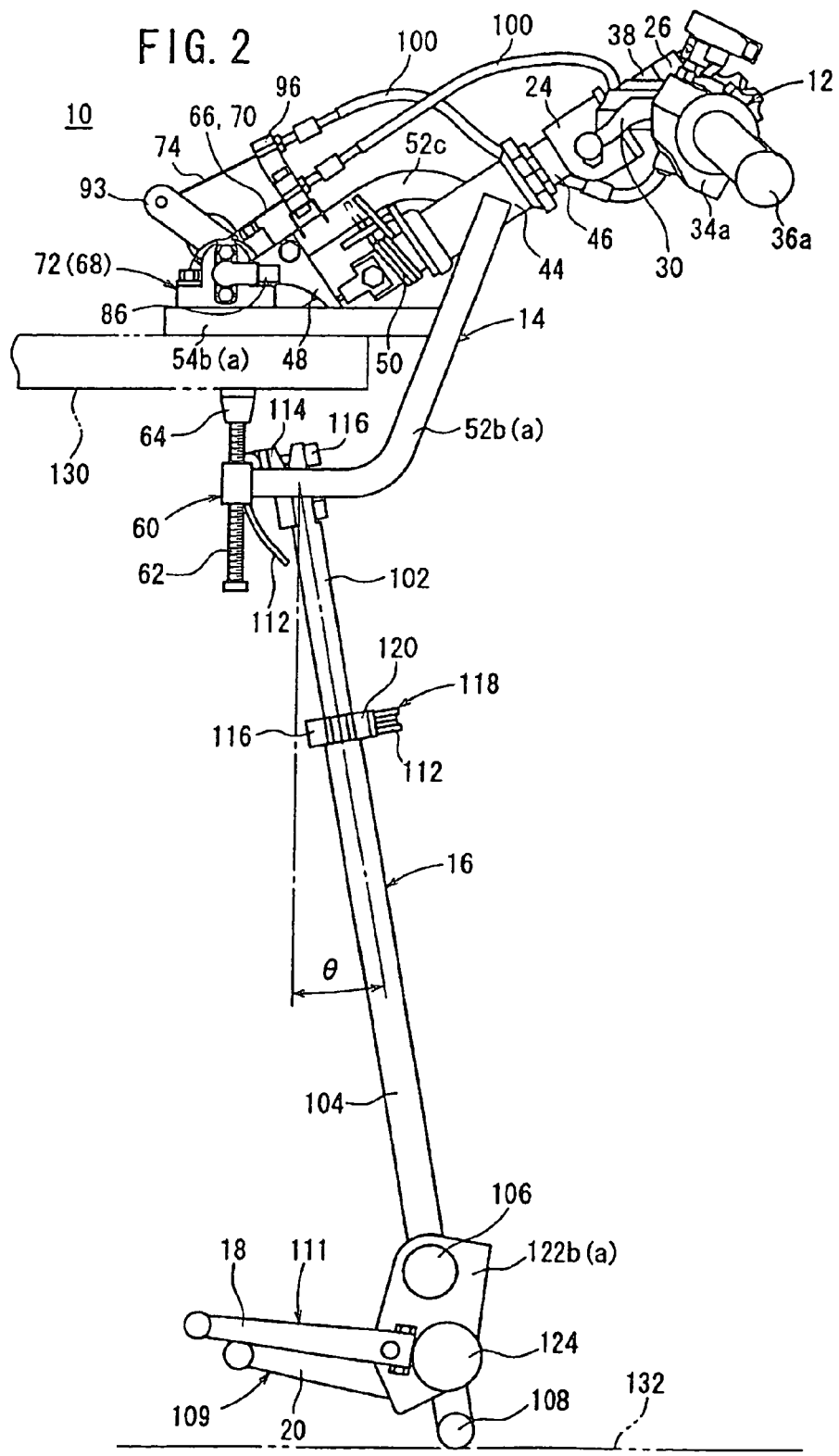
FIG. 2 is a side view of the riding simulation system shown in FIG. 1.

Next, the axis of the connection shaft 16 supported by a lower portion of the frame body 14 is inclined to a desired inclination angle θ against the vertical line (see FIG. 2). In this case, first, the fastening lever 112 of the inclination lock mechanism 110 provided at the upper end of the first shaft portion 102 is loosened by turning, and the connection shaft 16 is inclined to a desired angle against the connection frame 58. Incidentally, the inclination angle θ of the connection shaft 16 against the connection frame 58 can be set to an arbitrary angle according to the position of the pedal mechanism 22 in various motorcycles such as an American type one and a sportive type one.

In this case, the fixing screws 127a and 127b (see FIGS. 1 and 4) screw-engaged with upper portions of the mount plates 122a and 122b in the brake pedal unit 109 and the gear change pedal unit 111 are loosened. Then, the mount plates 122a and 122b are turned so as to set the gear change pedal 18 and the brake pedal 20 into a roughly horizontal condition. With the gear change pedal 18 and the brake pedal 20 in the roughly horizontal condition, the fixing screws 127a and 127b are tightened, whereby the mounting angles of the gear change pedal 18 and the brake pedal 20 are fixed.

As for example shown in FIG. 5, in the case of an American type motorcycle, the pedal mechanism 22 is located roughly directly on the lower side of the steering handle mechanism 12, so that the connection shaft 16 is inclined toward the front side of the simulation system 10 by a desired inclination angle θ1 against the vertical line.

On the other hand, as shown in FIG. 6, in the case of a sportive type motorcycle, the pedal mechanism 22 is located on the rear side of the simulation system 10 relative to the steering handle mechanism 12, so that the connection shaft 16 is inclined toward the rear side of the simulation system 10 by a desired inclination angle θ2 against the vertical line. Thus, with the single simulation system 10, pseudo-experience of running conditions of a variety of vehicle forms of motorcycles can be provided.

As shown in FIG. 2, after the connection shaft 16 is inclined to the desired inclination angle θ against the vertical line, the fastening lever 112 of the inclination lock mechanism 110 is turned in a direction opposite to the above-mentioned direction, whereby the connection frame 58 is fastened with the clamp 120. As a result, the inclination angle θ of the connection frame 58 against the connection shaft 16 is securely fixed.

Finally, the connection shaft 16 is extended or contracted to have a desired length. In this case, first, the fastening lever 112 of the extension/contraction lock mechanism 118 provided on the connection shaft 16 is loosened by turning, and, in the condition where the first shaft portion 102 is gripped, the second shaft portion 104 is extended or contracted so that the support portion 108 formed at the lower end portion of the second shaft portion 104 is grounded on the floor surface 132 or the like.

Then, in the condition where the support portion 108 of the second shaft portion 104 is grounded on the floor surface 132 or the like, the fastening lever 112 of the extension/contraction lock mechanism 118 is turned in a direction opposite to the above-mentioned direction, whereby the outer circumferential surface of the second shaft portion 104 is fastened through the clamp 120. As a result, the connection shaft 16 is fixed in the condition where the support portion 108 thereof is grounded on the floor surface 132 or the like. In other words, the length of the connection shaft 16 is fixed at an arbitrary length by the extension/contraction lock mechanism 118.

Therefore, an upper portion of the simulation system 10 is integrally fixed to the table 130 through the frame body 14, and the support portion 108 of the connection shaft 16 constituting a lower portion of the simulation system 10 makes contact with the floor surface 132, whereby the simulation system 10 is securely fixed.

Next, a method of operating the simulation system 10 mounted onto the table 130 or the like as above will be described.

First, as shown in FIG. 5, the operator 133 is seated on a chair 134 disposed on the rear side of the simulation system 10, grips the right grip 36b of the steering handle 28 by his right hand, and grips the left grip 36a of the steering handle 28 by his left hand.

Then, the operator 133 puts his right foot on the brake pedal 20 of the pedal mechanism 22, and puts hits left foot on the gear change pedal 18 of the pedal mechanism 22.

In this case, the pedal mechanism 22 on which both feet of the operator 133 are put is in contact with the floor surface 132 through the support portion 108 of the connection shaft 16, so that the pedal mechanism 22 is maintained in a stable condition without displacement even when the feet are put thereon.

After the preparatory stage as above-mentioned, the operator 133 operates the right grip 36b functioning as a throttle of the steering handle 28, the brake lever 32 and the clutch lever 30, whereby the throttle opening angle relating to the right grip 36b as well as the grip amounts of the brake lever 32 and the clutch lever 30 are outputted as detection signals to the control unit (not shown) by the throttle opening angle detection unit 76, the first detection unit 68 and the second detection unit 72.

In addition, when the brake pedal 20 is operated by the operator 133, the turning amount of the brake pedal 20 is detected by the turning amount detection unit 125a, and the detection signal is outputted to the control unit.

Furthermore, when the gear change pedal 18 is operated attendant on an operation of the clutch lever 30 by the operator 133, a detection signal indicating that a gear change has been done is outputted through the turning amount detection unit 125b to the control unit.

Then, based on these detection signals, the control unit displays the running condition of the simulation system 10 on the display 128 mounted on the table 130.

As described above, in the present embodiment, the connection shaft 16 is provided at a lower portion of the frame body 14 with the inclination lock mechanism 110 therebetween so that it can be inclined to a desired inclination angle.

Therefore, the inclination angle of the connection shaft 16 can be set to an arbitrary angle according to the vehicle forms of various motorcycles differing in the position of the pedal mechanism 22 such as an American type one and a sportive type one. As a result, the operator can get pseudo-experiences of running conditions of various vehicle forms of motorcycles differing in the position of the pedal mechanism 22 relative to the position of the steering handle mechanism 12, by use of the single simulation system 10.

In other words, the pedal mechanism 22 can be set to an arbitrary position by inclining the connection shaft 16 supported by the frame body 14 through the inclination lock mechanism 110.

In addition, the pedal mechanism 22 mounted to the connection shaft 16 is restricted in upward displacement by the stopper mechanisms 60, and is restricted in downward displacement by the support portion 108 of the connection shaft 16 which is in contact with the floor surface 132.

Therefore, the pedal mechanism 22 and the simulation system 10 as a whole are prevented from being displaced upwards or downwards when the gear change pedal 18 is operated upwards or downwards by the operator 133 through his foot. As a result, the operator can perform stable operation at all times.

Furthermore, even where the height of the table 130 or the like to which the frame body 14 is mounted is different, the support portion 108 of the connection shaft 16 can be securely brought into contact with the floor surface 132 or the like by extending or contracting the connection shaft 16. Therefore, it is not necessary to take the height of the table 130 or the like into consideration when the simulation system 10 is installed, resulting in higher degree of freedom for installation site.

Figure 7:
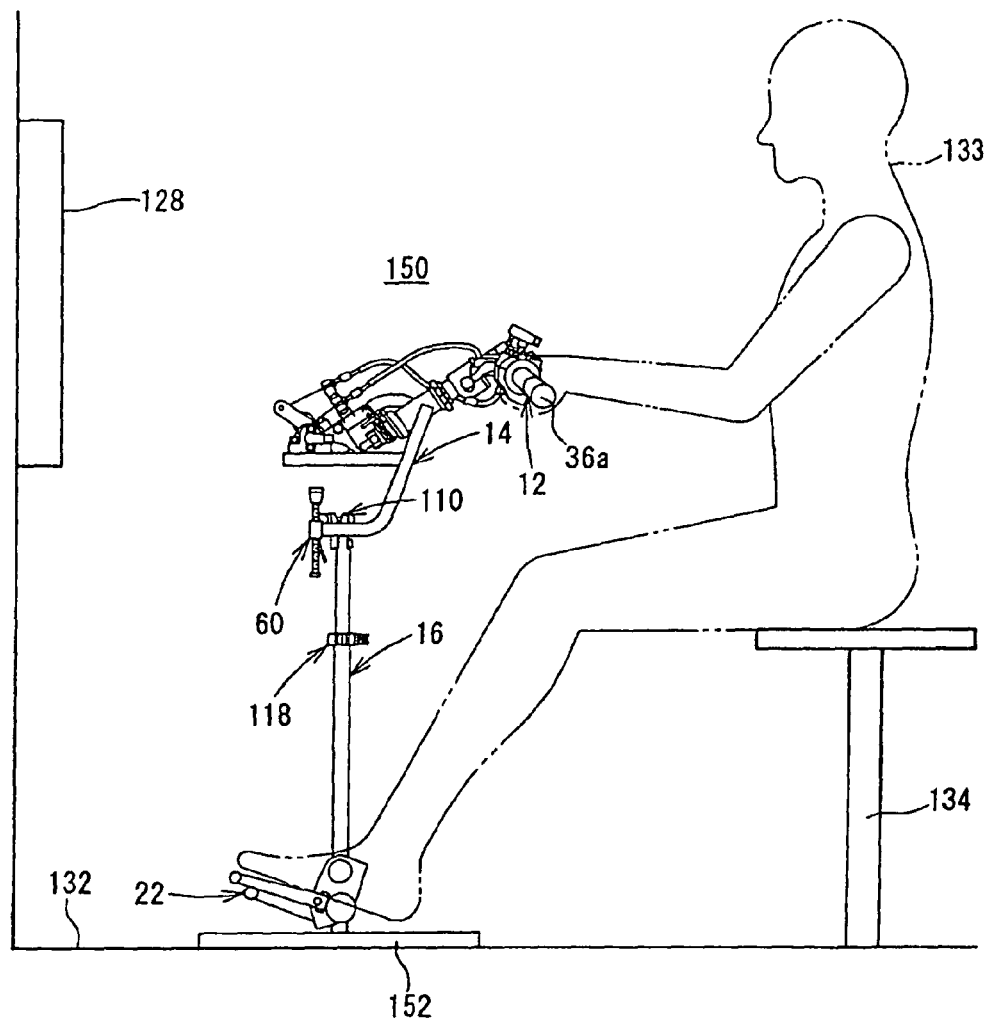
FIG. 7 is a side view of a riding simulation system according to another embodiment of the present invention.

Next, a riding simulation system 150 according to another embodiment is shown in FIG. 7. The same components as those in the riding simulation system according to the above-described embodiment will be denoted by the same reference symbols as used above, and detailed description thereof will be omitted.

The riding simulation system 150 according to the another embodiment of the present invention differs from the riding simulation system 10 according to the above-described embodiment in that a flat-surfaced mount plate 152 is provided at a lower end portion of the connection shaft 16 in place of the support portion 108 formed at the lower end portion of the connection shaft 16.

As shown in FIG. 7, the simulation system 150 is mounted on a floor surface 132 or the like through the flat-surfaced mount plate 152 which is formed at the lower end portion of the connection shaft 16 in the state of being roughly orthogonal to the axis of the connection shaft 16. An area of the mount plate 152 is formed a size enough to mount the simulation system 150 with stability.

Therefore, the simulation system 150 can be installed by use of only the mount plate 152, so that the simulation system 150 can be used even where a table 130 or the like for fixing the frame body 14 is absent in the vicinity. In other words, there is no need for the table 130 or the like to mount the simulation system 150 and the display 128.

In addition, the simulation system 150 can be easily moved because it is installed by use of only the mount plate 152. Therefore, it is possible to easily regulate, for example, the distance between the simulation system 150 and the display 128 to a desired distance.

Further, as compared with the case where the lower portion of the simulation system 150 is brought into contact with the floor surface 132 through the support portion 108, the operator 133 can perform operations more stably, since the mount plate 152 has a large area of contact with the floor surface 132.

Figure 8:
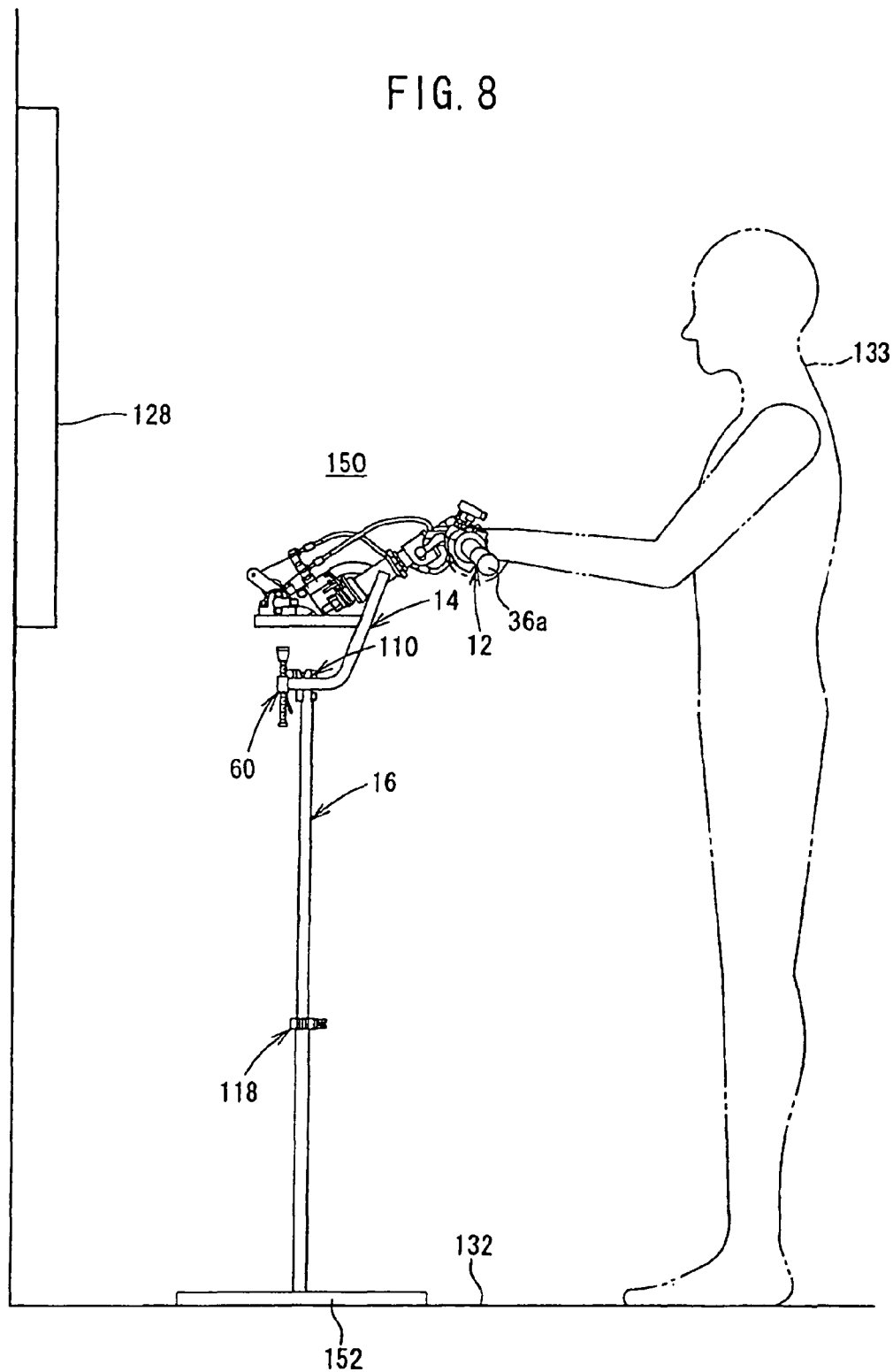
FIG. 8 is a side view of the riding simulation system of FIG. 7 in the condition where the pedal mechanism has been detached.

Furthermore, as shown in FIG. 8, when the pedal mechanism 22 mounted on the lower side of the connection shaft 16 in the simulation system 150 is detached, the operator can get a pseudo-experience of a motorcycle not fitted with the pedal mechanism 22, for example, a motor bicycle.

Figure 9:
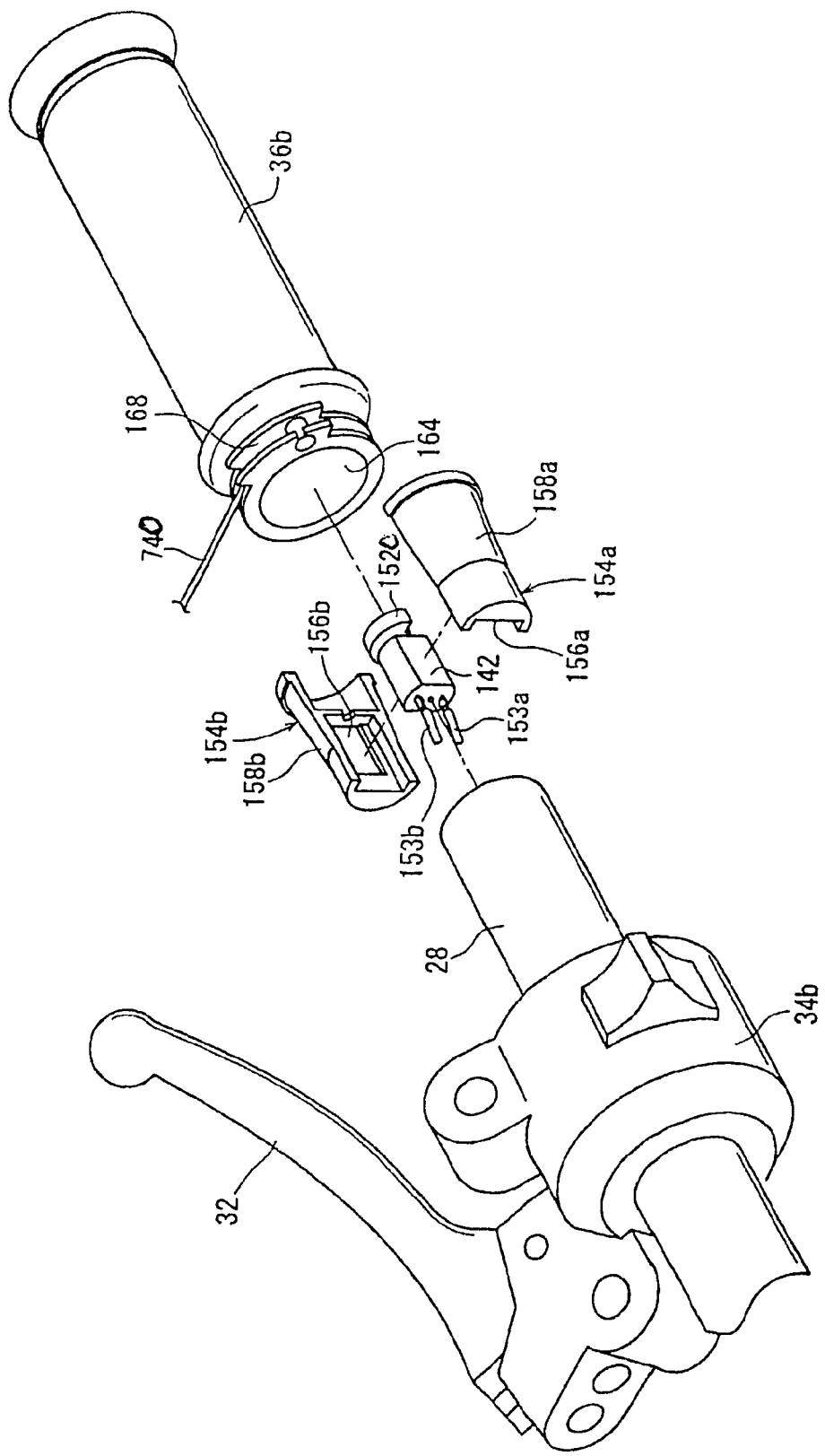
FIG. 9 is an exploded perspective view of a mount structure of a vibrator in the riding simulation system shown in FIG. 1.
Figure 10:
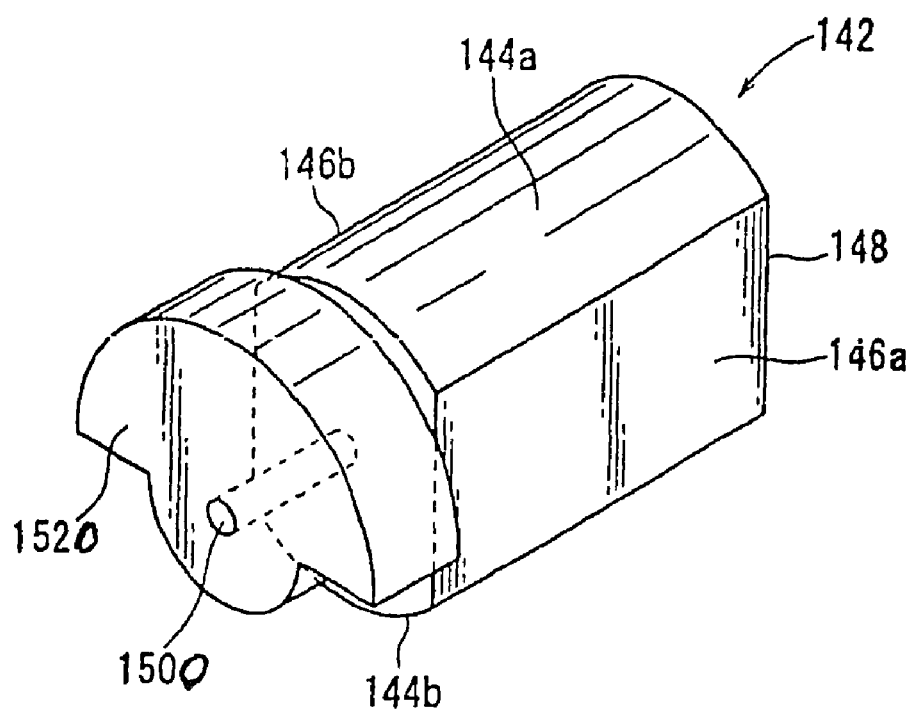
FIG. 10 is a sectional view of the mount structure shown in FIG. 9.
Figure 11:
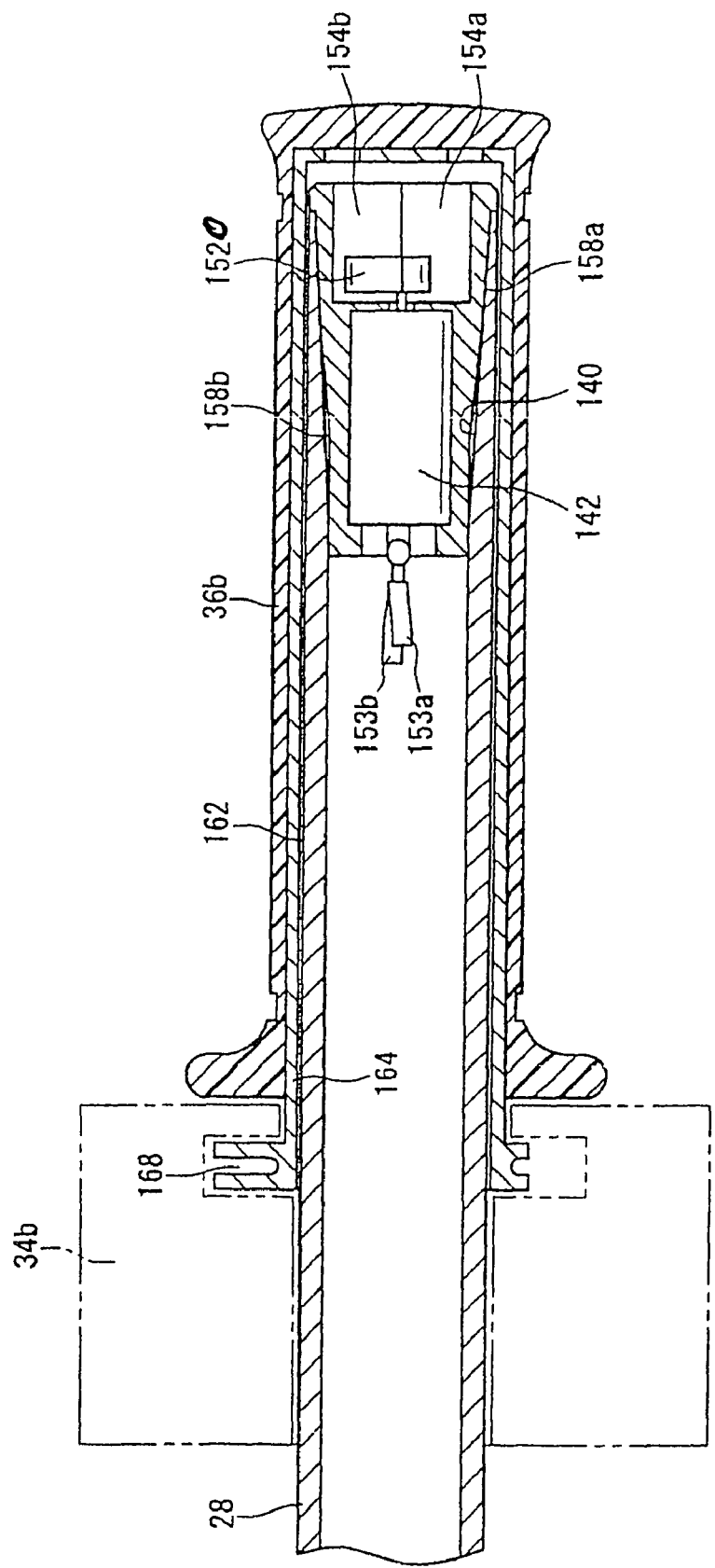
FIG. 11 is a perspective illustration of the vibrator.

Referring to FIGS. 9, 10, and 11, the paragraphs below describe the dummy engine vibration simulator and a mount structure of a vibrator (motor 142) disposed in the steering handle pipe 28 onto which the right grip 36b as the throttle grip is mounted.

The steering handle pipe 28 is composed of a hollow cylindrical pipe, and the inner circumferential surface on an end portion side is provided as a taper surface portion 140 which gradually decreases in diameter toward the inside.

On the other hand, a motor 142 as the vibrator inserted into the taper surface portion 140 is contained in a case 148 having curved surface portions 144a and 144b and flat surface portions 146a and 146b, as shown in FIG. 11. An eccentric cam 1520 is attached to a rotary shaft 1500 projecting from the case 148 to the outside. In addition, lead wires 153a and 153b for supplying electric power to the motor 142 are connected to the portions on the opposite side of the eccentric cam 1520, of the case 148.

As can be seen in FIG. 9, a pair of brackets 154a and 154b is attached to the motor 142. The brackets 154a and 154b include recessed portions 156a and 156b for engagement with the flat surface portions 146a and 146b of the case 148 in the motor 142, taper surface portions 158a and 158b inclined in correspondence with the taper surface portion 140 of the steering handle pipe 28, and engaging portions 160a and 160b which are formed at end portions of the taper surface portions 158a and 158b on the side of a larger outside diameter and which project outwards by a predetermined amount.

The recessed portions 156a and 156b of the brackets 154a and 154b are engaged with the flat surface portions 146a and 146b of the case 148 constituting the motor 142. The brackets 154a and 154b are inserted into the taper surface portion 140 of the steering handle pipe 28 in the state of being engaged with the motor 142. In this case, the taper surface portions 158a and 158b of the brackets 154a and 154b are engaged with the taper surface portion 140 of the steering handle pipe 28. In addition, the engaging portions 160a and 160b of the brackets 154a and 154b are engaged with an end portion of the steering handle pipe 28. Incidentally, the lead wires 153a and 153b of the motor 142 pass through the inside of the steering handle pipe 28 and are led out to the exterior through a central portion of the steering handle pipe 28.

A throttle sleeve 164 is mounted on an outer circumferential portion of the steering handle pipe 28, with a predetermined gap 162 therebetween. One end portion of the throttle sleeve 164 is engaged with the lever joint portion 34b, whereby the throttle sleeve 164 is held on the steering handle pipe 28. The right grip 36b as the throttle grip is mounted on the outer circumferential surface of the throttle sleeve 164.

Incidentally, an engaging portion 168 for engagement with the throttle wire 740 is provided at one end portion of the throttle sleeve 164.

The riding simulation system 10 according to the embodiment of the present invention is basically constituted as above, and operations and functions or effects thereof will be described below.

First, the simulation system 10 is mounted onto a table 130 (see FIG. 5). For example, as shown in FIG. 5, the simulation system 10 is mounted so that the lower surfaces of the pair of sub-frames 54a and 54b in the frame body 14 make contact with the upper surface of the table 130 on which a display 128 is mounted. Next, the fixing bolts 62 of the stopper mechanisms 60 are displaced upward by turning, and the top faces of the holding portions 64 formed at upper portions of the fixing bolts 62 are brought into contact with the lower surface of the table 130. As a result, the table 130 is clamped between the sub-frames 54a and 54b and the holding portions 64 of the stopper mechanisms 60.

Next, the axis of the connection shaft 16 supported on a lower portion of the frame body 14 is inclined to a desired inclination angle θ against the vertical line (see FIG. 2). In this case, first, the fastening lever 122 of the inclination lock mechanism 110 provided at the upper end of the first shaft portion 102 is loosened by turning, and the connection shaft 16 is inclined to a predetermined angle against the connection frame 58. Incidentally, the inclination angle θ of the connection shaft 16 relative to the connection frame 58 can be set to an arbitrary angle according to the position of the pedal mechanism 22 in various motorcycles such as an American type one, a sportive type one, etc.

In this case, the fixing screws 127a and 127b (see FIGS. 1 and 4) screw-engaged with upper portions of the mount plates 122a and 122b in the brake pedal unit 109 and the gear change pedal unit 111 are loosened. Then, the mount plates 122a and 122b are turned for such a setting that the gear change pedal 18 and the brake pedal 20 are set into a roughly horizontal condition. With the gear change pedal 18 and the brake pedal 20 in the roughly horizontal condition, the fixing screws 127a and 127b are tightened, to fix the mount angles of the gear change pedal 18 and the brake pedal 20.

After the connection shaft 16 is inclined to a desired inclination angle θ against the vertical line, the fastening lever 112 of the inclination lock mechanism 110 is turned in a direction opposite to the above, whereby the connection frame 58 is fastened by the clamp 120. As a result, the inclination angle θ of the connection frame 58 against the connection shaft 16 is securely fixed.

Finally, the connection shaft 16 is extended or contracted to a desired length. In this case, first, the fastening lever 112 of the elongation/contraction lock mechanism 118 provided at the connection shaft 16 is loosened by turning, and, in the condition where the first shaft portion 102 is gripped, the second shaft portion 104 is extended or contracted so that the support portion 108 formed at a lower end portion of the second shaft portion 104 is grounded on a floor surface 132 or the like.

In the condition where the support portion 108 of the second shaft portion 104 is grounded on the floor surface 132 or the like, the fastening lever 112 of the extension/contraction lock mechanism 118 is turned in a direction opposite to the above, whereby the outer circumferential surface of the second shaft portion 104 is fastened through the clamp 120. As a result, the connection shaft 16 is fixed in the condition where the support portion 108 thereof is grounded on the floor surface 132 or the like.

Next, a method of operating the dummy engine vibration simulator of the riding simulation system 10 mounted on the table 130 will be described.

First, as shown in FIG. 5, the operator 133 is seated on a chair 134 mounted on the rear side of the simulation system 10, and the left grip 36a and the right grip 36b constituting the steering handle mechanism 12 are gripped. Next, the operator 133 puts his right foot on the brake pedal 20 of the pedal mechanism 22, and puts his left foot on the gear change pedal 18 of the pedal mechanism 22.

After the above preparatory stage, when the operator 133 operates the right grip 36b, the brake lever 32, and the clutch lever 30, the throttle opening angle and the grip amounts of the brake lever 32 and the clutch lever 30 are outputted as detection signals to the control unit (not shown) by the throttle opening angle detection unit 76, the first detection unit 68, and the second detection unit 72.

In addition, when the brake pedal 20 is operated by the operator 133, the turning amount of the brake pedal 20 is detected by the turning amount detection unit 125, and the detection signal is outputted to the control unit.

Furthermore, when the gear change pedal 18 is operated attendant on the operation of the clutch lever 30 by the operator 133, a detection signal indicating that a gear change has been made is outputted to the control unit through the turning amount detection unit 125b.

Then, based on these detection signals, the control unit displays the running condition of the simulation system 10 on the display 128 mounted on the table 130.

Here, in the simulation system 10 according to this embodiment, by driving the motor 142 as the vibrator disposed inside the steering handle pipe 28, it is possible to transmit a dummy vibration according to the rotating speed of a dummy engine to the operator 133, and thereby to permit the operator 133 to get an ambience through the vibration.

Specifically, when the right grip 36b is turned by the operator 133, the throttle wire 74 is displaced through the throttle sleeve 164. The displacement of the throttle wire 74 is detected by the throttle opening angle detection unit 76, the control unit (not shown) produces a drive signal according to the turning amount of the right grip 36b, and the motor 142 is driven through the lead wires 153a and 153b. With the motor 142 rotated, the eccentric cam 152 attached to the rotary shaft 150 thereof is rotated, whereby a vibration is generated.

The vibration generated by the motor 142 is transmitted through the brackets 154a and 154b to the steering handle pipe 28. In this case, since the motor 142 is attached to an end portion of the steering handle pipe 28, the vibration generated is amplified by the steering handle pipe 28, and is transmitted to the right hand of the operator 133 through the throttle sleeve 164 and the right grip 36b.

Besides, since the steering handle pipe 28 is composed of the single pipe communicating to the left grip 36a, the vibration generated on the side of the right grip 36b is efficiently transmitted up to the left grip 36a. Therefore, the operator 133 can experience the dummy vibration with also the left hand through the right grip 36b. In this case, since the throttle sleeve 164 is attached to the steering handle pipe 28 in the state of being rotatable through the gap 162, the vibration is transmitted to the right grip 36b without being largely attenuated by the hand of the operator 133 gripping the right grip 36b. Therefore, while the motor 142 is driven by a drive force as small as possible, the vibration can be efficiently transmitted to the left grip 36a and the right grip 36b, which is economical.

Incidentally, as shown in FIG. 10, the motor 142 for generating the vibration, in the state of being fitted in the recessed portions 156a and 156b of the brackets 154a and 154b, is fixed by inserting the taper surface portions 158a and 158b of the brackets 154a and 154b into the taper surface portion 140 of the steering handle pipe 28. Therefore, the motor 142 is securely fixed in the state of being free of chattering relative to the steering handle 28, so that there is no room for generation of vibrations other than the vibration produced by the motor 142, and a noiseless dummy vibration can be reproduced with high accuracy.

On the other hand, since the motor 142 and the steering handle pipe 28 are connected to each other only through the brackets 154a and 154b, an operation of detaching the motor 142 at the time of, for example, maintenance or the like can be carried out easily.

Specifically, where there is a need for maintenance, first, the lever joint portion 34b is detached, then the throttle sleeve 164 and the right grip 36b are drawn out from the steering handle pipe 28. Next, the motor 142 is drawn out of the steering handle pipe 28 together with the brackets 154a and 154b. By only the above operations, the required process can be achieved. In this instance, since the brackets 154a and 154b have the engaging portions 160a and 160b at the end portions thereof engaged with the end portion of the steering handle pipe 28, the brackets 154a and 154b are prevented from inserted excessively into the inside of the steering handle pipe 28, so that there is no possibility of a trouble in the detaching operation.

Figure 12:
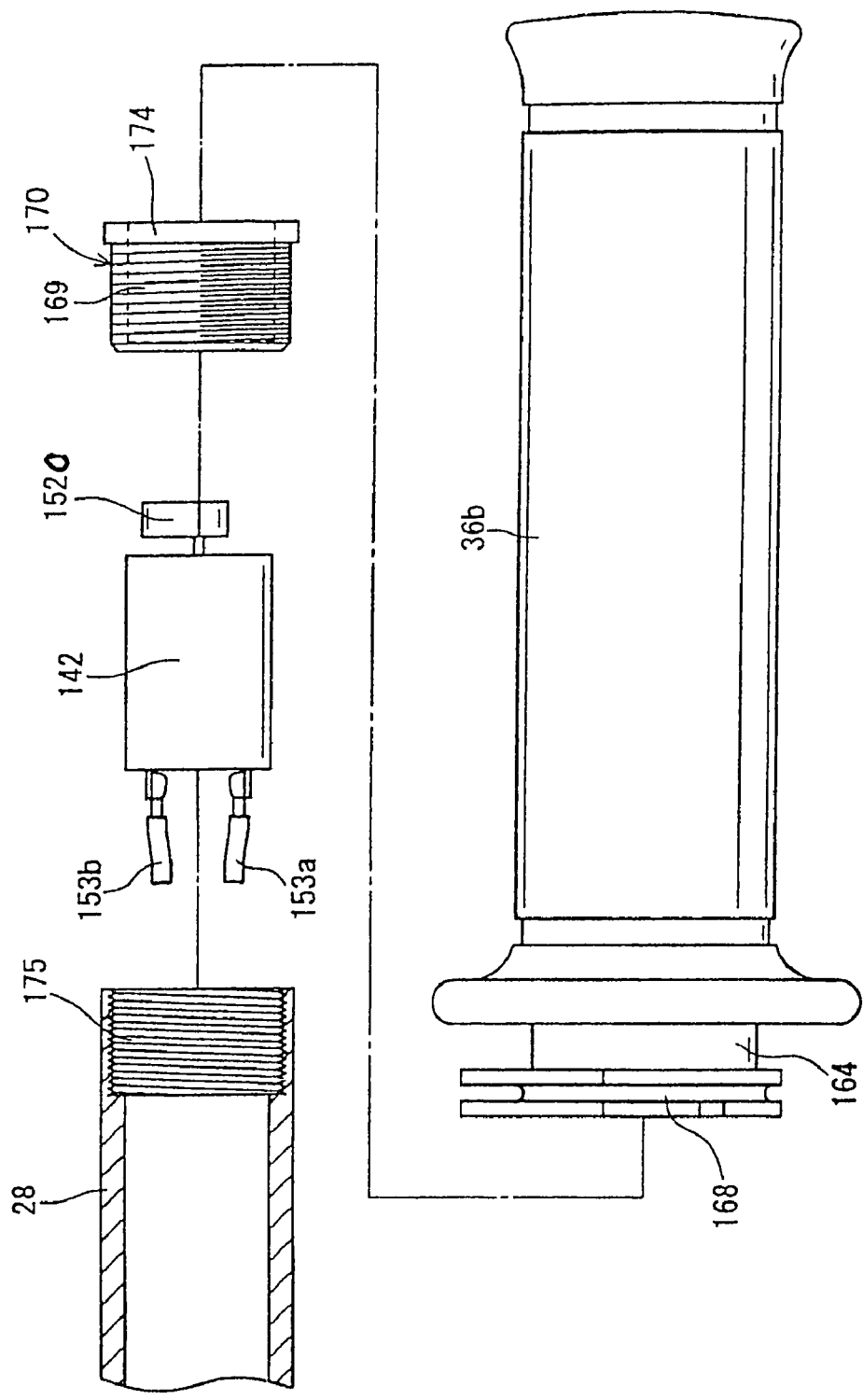
FIG. 12 is an exploded view of another mount structure of the vibrator in the riding simulation system shown in FIG. 1.
Figure 13:
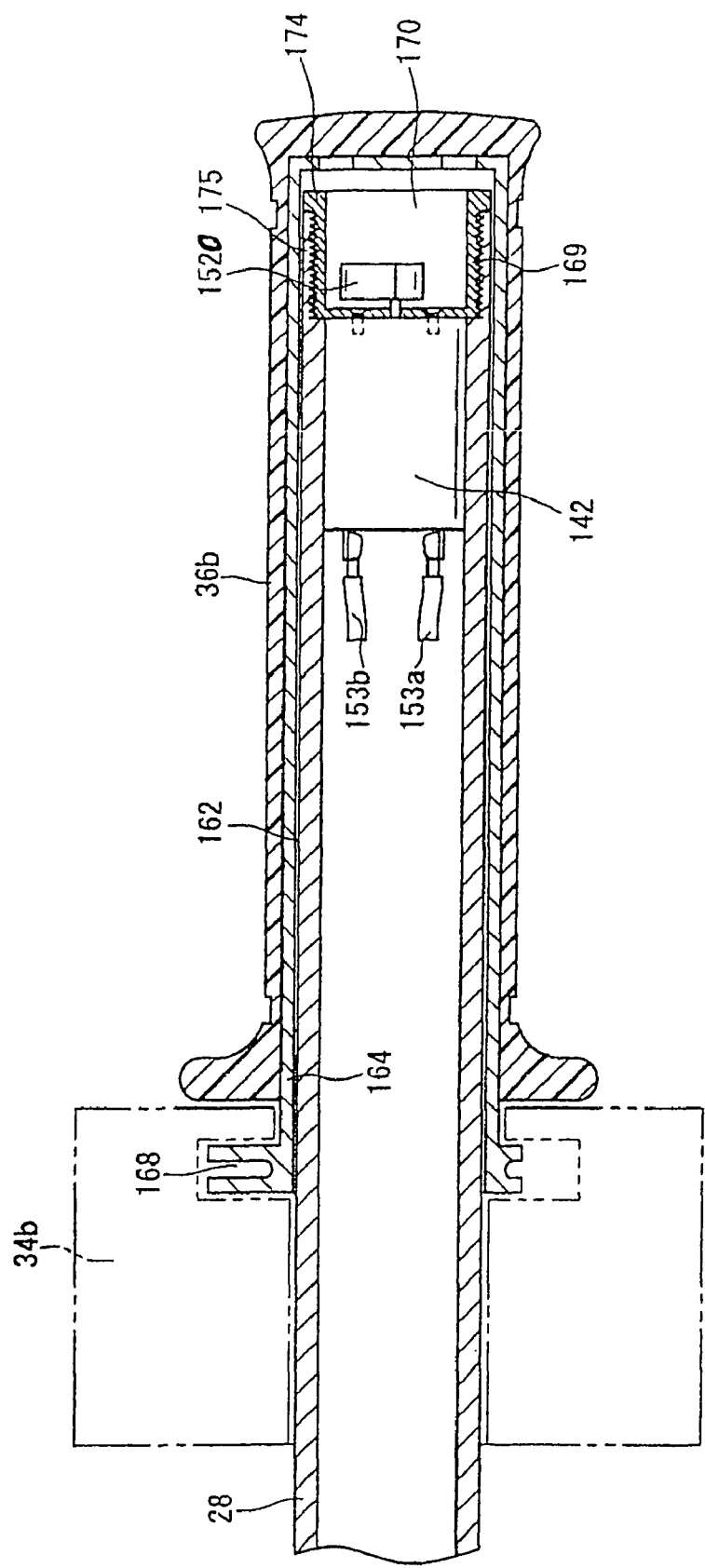
FIG. 13 is a sectional view of the mount structure shown in FIG. 12.

FIGS. 12 and 13 illustrate another mount structure of the motor 142 as the vibrator. In this case, the motor 142 is fixed by a bolt 172 to a bracket 170 provided with a male screw 169 in an outer circumferential surface thereof. Incidentally, the bracket 170 has an engaging portion 174 for engagement with an end portion of the steering handle pipe 28, at its end portion remote from the motor 142 which is fixed. On the other hand, the inner circumferential portion of an end portion of the steering handle pipe 28 is provided with a female screw 175 for screw engagement with the male screw 169 of the bracket 170.

In such a structure, the motor 142 fixed to the bracket 170 by the bolt 172 is inserted through the end portion of the steering handle pipe 28, and the male screw 169 of the bracket 170 is screw-engaged with the female screw 175 of the steering handle pipe 28, whereby the motor 142 is securely fixed. In addition, by only rotating the bracket 170, the motor 142 can be easily detached.

Incidentally, while the motor 142 is inserted into the inside of the steering handle pipe 28 on which the right grip 36b as the throttle grip is mounted in the above-described embodiment, a structure may be adopted in which, for example, a gap is formed between the left grip 36a and the steering handle pipe 28, and the motor 142 is inserted into the inside of the steering handle pipe 28 on which the left grip 36a is mounted. In this case, the vibration generated by the motor 142 is efficiently transmitted from one end portion of the steering handle pipe 28 on which the left grip 36a is mounted to the other end portion of the steering handle pipe 28 on which the right grip 36b is mounted.

Referring to FIGS. 14-17, the click generating means 1501 of the riding simulation system 10 of the present invention will be described next.

The gear change pedal 18 is provided with a click generating means 1501 for generating a click sound of "click" and generating a vibration similar to the operating feeling of a gear change in an actual motorcycle when a shift change is made by operating the gear change pedal 18 with the left foot.

Figure 14:
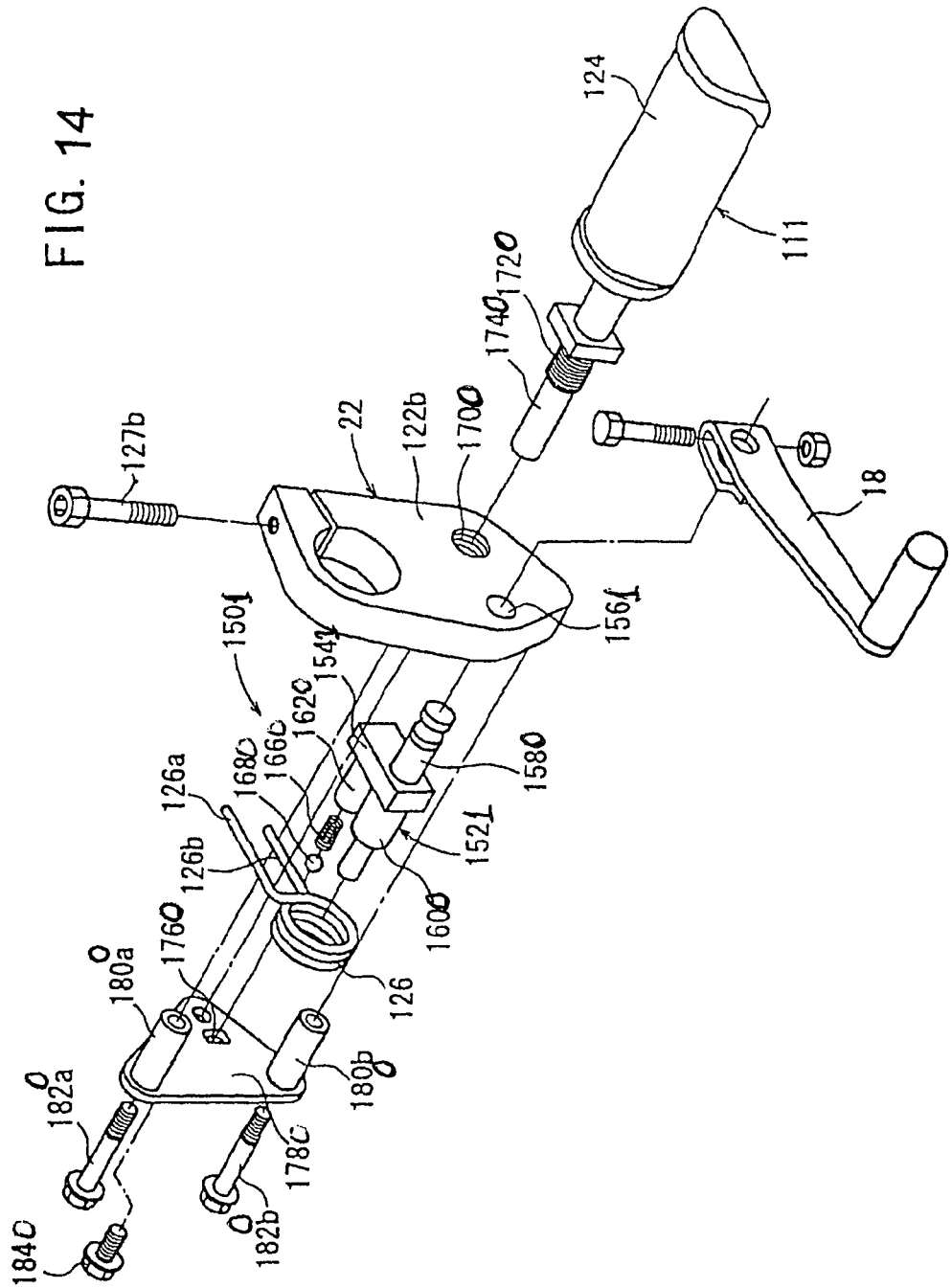
FIG. 14 is an exploded perspective view of a click generating means constituting the riding simulation system shown in FIG. 1.
Figure 15:
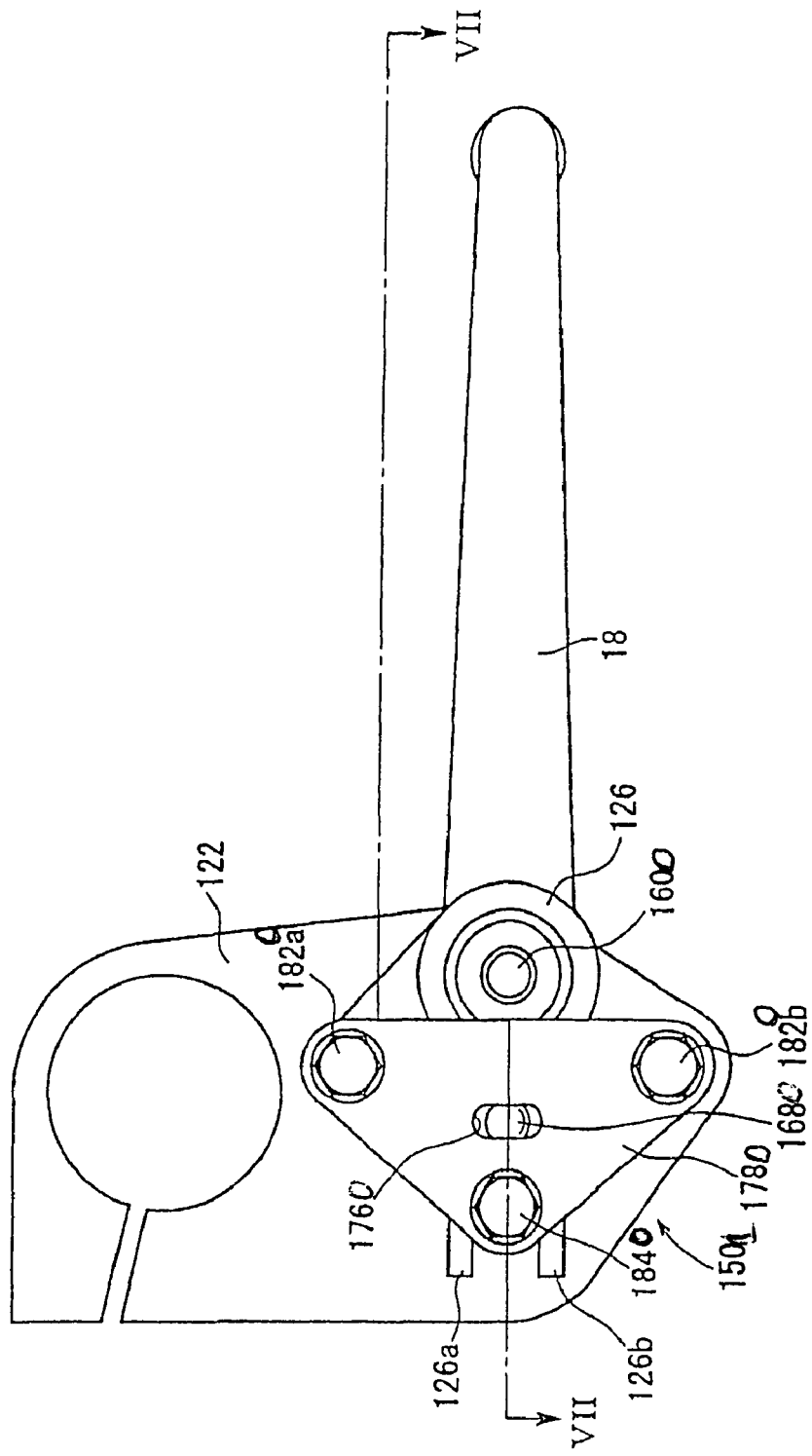
FIG. 15 is a side view of the click generating means shown in FIG. 14.

As shown in FIG. 14, the click generating means 1501 includes a support member 1521 for supporting the gear change pedal 18 connected thereto so that the gear change pedal 18 can be turned by a predetermined angle. The support member 1521 is comprised of a rectangular block body 1541, the first shaft portion 1580 having an end portion penetrating through the hole portion 1560 of the mount plate 1220b, with the gear change pedal 18 connected to the end portion, a stepped second shaft portion 1600 projecting coaxially with and to the opposite side of the first shaft portion 1580 with the block body 1541 therebetween, and a third shaft portion 1620 projecting roughly in parallel to the second shaft portion 1600 at a location close to the second shaft portion 1600. The block body 1541 and the first to third shaft, portions 1580, 1600, and 1620 are constructed as one body.

Figure 16:
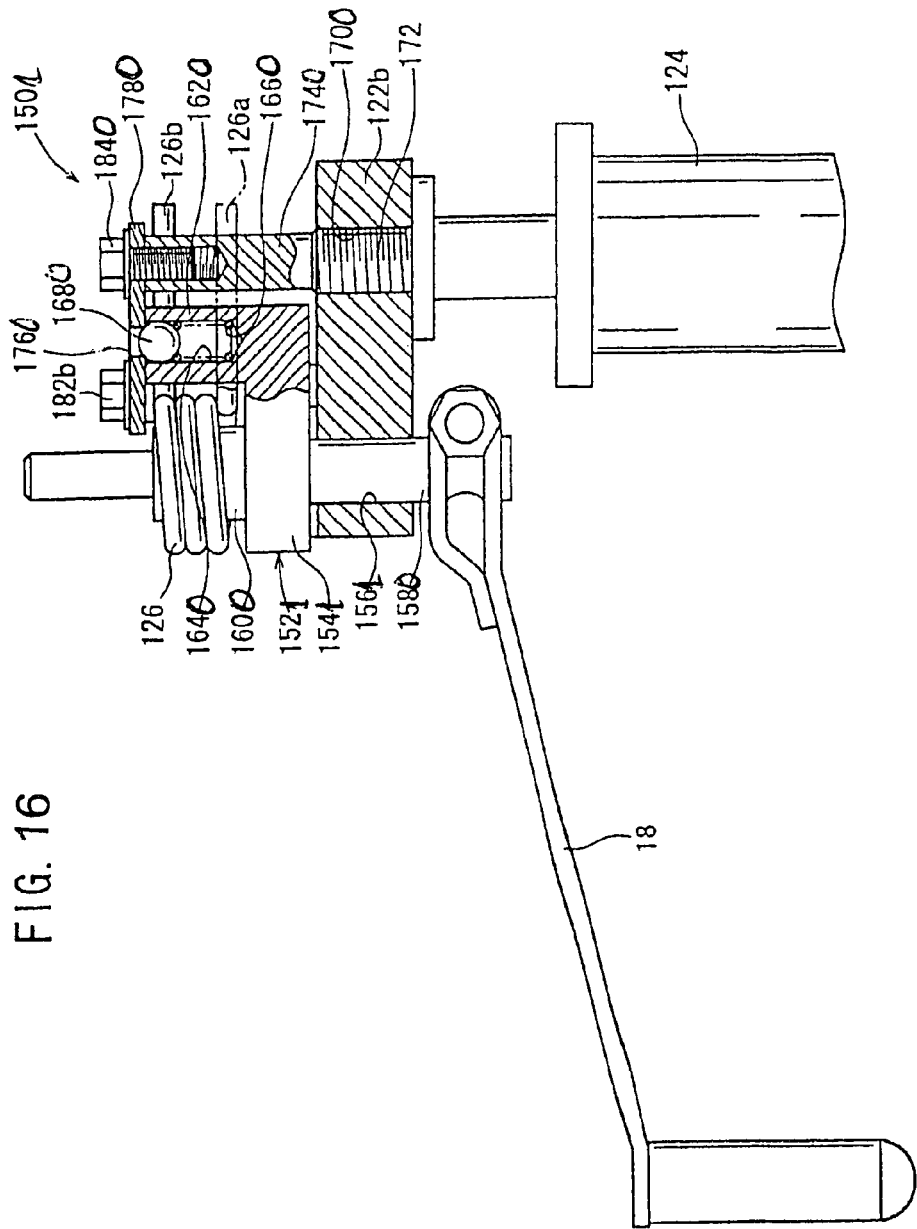
FIG. 16 is a cross-sectional view taken along line of FIG. 15.
Figure 17:
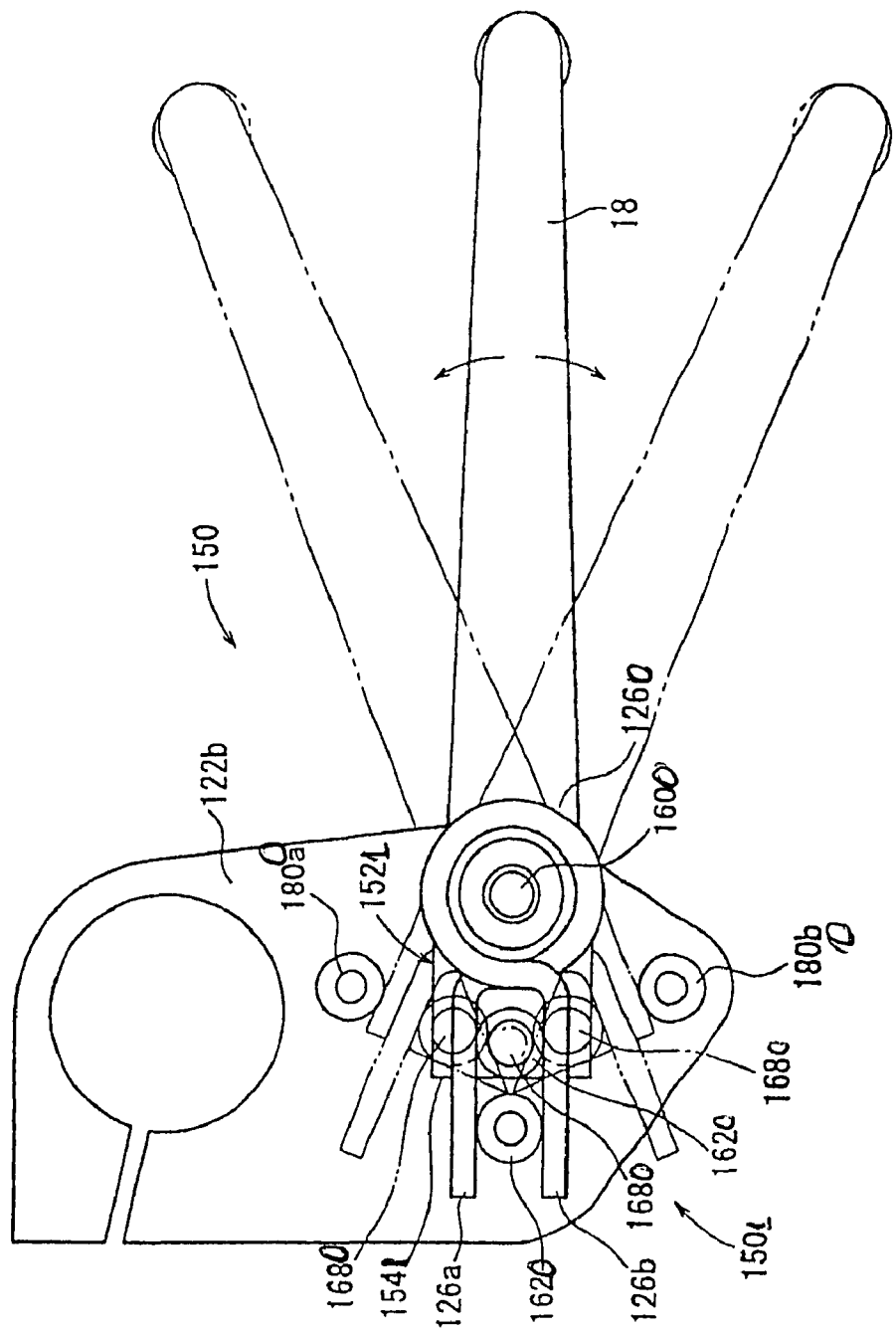
FIG. 17 is an illustration of operation of the click generating means shown in FIG. 14.

As shown in FIG. 16, the third shaft portion 1620 provided with a bottomed hole portion 1640 extending over a predetermined length along the axial direction from an end portion thereof, and a coil spring 1660 and a steel ball (ball member) 1680 engaged with an end portion of the coil spring 1660 are provided in the bottomed hole portion 1640.

Furthermore, the click generating means 1501 comprises a support shaft 1740 which has a screw portion 1720 screw-engaged with a screw hole 1700 in the mount plate 122 and which penetrates through the mount plate 122b, with a step 124 connected to an end portion thereof, a return spring 126 wound around the second shaft portion 1600 and having both end portions 126a and 126b between which the support shaft 1740 is engaged, and a triangular cover member 1780 provided with an window portion 1760 constituted of a hole portion in which the steel ball 1680 is engaged. The return spring 126 is engaged with the support shaft 174, and has the function of maintaining the gear change pedal 18 in a center position under the action of the spring force thereof.

Incidentally, the inside wall size of the window portion 1760 with which the steel ball 1680 is engaged is so set that the steel ball 1680 will not jump out to the exterior through the window portion 1760.

Furthermore, the click generating means 1501 comprises a pair of sleeves 1800a and 1800b interposed between the mount plate 122b and the cover member 1780 and functioning as stoppers, a pair of bolts inserted in through-holes of the sleeves 1800a and 1800b, and a screw member 184 screwed into a screw hole in the support shaft 1740. The cover member 1780 and the mount plate 122b are mounted roughly in parallel to each other, through the pair of bolts 1820a and 1820b and the screw member 1840.

The riding simulation system 10 according to the embodiment of the present invention is basically constituted as above. Next, operations and functions or effects of the riding simulation system 10 will be described below. First, a method of mounting the simulation system 10 to a table 130 (see FIGS. 5 and 6) or the like will be described.

First, as for example shown in FIG. 5, the lower surfaces of the pair of sub-frames 54a and 54b in the frame body 14 are seated on the top surface of the flat-surfaced table 130 on which the display 128 is mounted. Then, the fixing bolts 62 of the stopper mechanisms 60 are turned to be displaced upwards, whereby the top faces of the holding portions 64 formed at the upper portions of the fixing bolts 62 are brought into contact with the lower surface of the table 130. As a result, the table 130 is clamped between the sub-frames 54a and 54b and the holding portions 64 of the stopper mechanisms 60. In other words, the simulation system 10 is easily fixed to the table 130 with the sub-frames 54a and 54b and the stopper mechanisms 60.

Next, the axis of the connection shaft 16 supported by a lower portion of the frame body 14 is inclined to a desired inclination angle θ against the vertical line (see FIG. 2). In this case, first, the fastening lever 112 of the inclination lock mechanism 110 provided at the upper end of the first shaft portion 102 is loosened by turning, and the connection shaft 16 is inclined to a desired angle against the connection frame 58. Incidentally, the inclination angle θ of the connection shaft 16 against the connection frame 58 can be set to an arbitrary angle according to the position of the pedal mechanism 22 in various motorcycles such as an American type one and a sportive type one.

In this case, the fixing screws 127a and 127b (see FIGS. 1 and 4) screw-engaged with upper portions of the mount plates 122a and 122b in the brake pedal unit 109 and the gear change pedal unit 111 are loosened. Then, the mount plates 122a and 122b are turned so as to set the gear change pedal 18 and the brake pedal 20 into a roughly horizontal condition. With the gear change pedal 18 and the brake pedal 20 in the roughly horizontal condition, the fixing screws 127a and 127b are tightened, whereby the mounting angles of the gear change pedal 18 and the brake pedal 20 are fixed.

As for example shown in FIG. 5, in the case of an American type motorcycle, the pedal mechanism 22 is located roughly directly on the lower side of the steering handle mechanism 12, so that the connection shaft 16 is inclined toward the front side of the simulation system 10 by a desired inclination angle θ1 against the vertical line.

On the other hand, as shown in FIG. 6, in the case of a sportive type motorcycle, the pedal mechanism 22 is located on the rear side of the simulation system 10 relative to the steering handle mechanism 12, so that the connection shaft 16 is inclined toward the rear side of the simulation system 10 by a desired inclination angle θ2 against the vertical line. Thus, with the single simulation system 10, pseudo-experience of running conditions of a variety of vehicle forms of motorcycles can be provided.

As shown in FIG. 2, after the connection shaft 16 is inclined to the desired inclination angle θ against the vertical line, the fastening lever 112 of the inclination lock mechanism 110 is turned in a direction opposite to the above-mentioned direction, whereby the connection frame 58 is fastened with the clamp 120. As a result, the inclination angle θ of the connection frame 58 against the connection shaft 16 is securely fixed.

Finally, the connection shaft 16 is extended or contracted to have a desired length. In this case, first, the fastening lever 112 of the extension/contraction lock mechanism 118 provided on the connection shaft 16 is loosened by turning, and, in the condition where the first shaft portion 102 is gripped, the second shaft portion 104 is extended or contracted so that the support portion 108 formed at the lower end portion of the second shaft portion 104 is grounded on the floor surface 132 or the like.

Then, in the condition where the support portion 108 of the second shaft portion 104 is grounded on the floor surface 132 or the like, the fastening lever 112 of the extension/contraction lock mechanism 118 is turned in a direction opposite to the above-mentioned direction, whereby the outer circumferential surface of the second shaft portion 104 is fastened through the clamp 120. As a result, the connection shaft 16 is fixed in the condition where the support portion 108 thereof is grounded on the floor surface 132 or the like. In other words, the length of the connection shaft 16 is fixed at an arbitrary length by the extension/contraction lock mechanism 118.

Therefore, an upper portion of the simulation system 10 is integrally fixed to the table 130 through the frame body 14, and the support portion 108 of the connection shaft 16 constituting a lower portion of the simulation system 10 makes contact with the floor surface 132, whereby the simulation system 10 is securely fixed. Incidentally, the table 130 is assumed to be stably supported on the floor surface 132 through leg portions 135.

Next, a method of operating the click generating means of the simulation system 10 mounted onto the table 130 or the like will be described.

First, as shown in FIG. 5, the operator 133 is seated on a chair 134 disposed on the rear side of the simulation system 10, grips the right grip 36b of the steering handle 28 by his right hand, and grips the left grip 36a of the steering handle 28 by his left hand.

Then, the operator 133 puts his right foot on the brake pedal 20 of the pedal mechanism 22, and puts hits left foot on the gear change pedal 18 of the pedal mechanism 22.

In this case, the pedal mechanism 22 on which both feet of the operator 133 are put is in contact with the floor surface 132 through the support portion 108 of the connection shaft 16, so that the pedal mechanism 22 is maintained in a stable condition without displacement even when the feet are put thereon.

After the preparatory stage as above-mentioned, the operator 133 operates the right grip 36b functioning as a throttle of the steering handle 28, the brake lever 32 and the clutch lever 30, whereby the throttle opening angle relating to the right grip 36b as well as the grip amounts of the brake lever 32 and the clutch lever 30 are outputted as detection signals to the control unit (not shown) by the throttle opening angle detection unit 76, the first detection unit 68 and the second detection unit 72.

In addition, when the brake pedal 20 is operated by the operator 133, the turning amount of the brake pedal 20 is detected by the potentiometer 125a, and the detection signal is outputted to the control unit.

Furthermore, when the gear change pedal 18 is operated attendant on an operation of the clutch lever 30 by the operator 133, a detection signal indicating that a gear change has been done is outputted through a potentiometer 125b to the control unit.

Then, based on these detection signals, the control unit displays the running condition of the simulation system 10 on the display 128 mounted on the table 130.

When a shift change (shift-up or shift-down) is made by the operator 133 by pulling the gear change pedal 18 upwards or stepping in the gear change pedal 18 downwards, the gear change pedal 18 is turned by a predetermined angle with the first shaft portion 1580 as a fulcrum, and the third shaft portion 1620 projecting the opposite side of the first shaft portion 1580 is turned by a predetermined angle integrally with the second shaft portion 1600 with the second shaft portion 1600 as a center.

Namely, by the operation of the gear change pedal 18, the third shaft portion 1620 of the support member 1521 is rotated clockwise or counterclockwise with the coaxially formed first and second shaft portions 158 and 160 as a center (see FIG. 17), and the steel ball 1680 mounted in the bottomed hole portion 164 of the third shaft portion 1620 is displaced as one body with the third shaft portion 1620 through the coil spring 1660. Incidentally, the third shaft portion 1620 comes into contact with one of the sleeves 180a (180b) functioning as a stopper, whereby displacement of the third shaft portion is restricted.

Therefore, in the initial condition where the gear change pedal 18 is maintained in the center position, when the steel ball 1680 engaged with the rectangular window portion 1760 of the cover member 178 is displaced as one body with the third shaft portion 1620, the steel ball 1680 is released from the window portion 1760 against the spring force of the coil spring 1660 and slides along the wall surface of the cover member 1780.

Then, at the time of returning again to the initial condition by the spring force of the return spring 126 for maintaining the center position, the steel ball 1680 is engaged with the window portion 1760 of the cover member 1780 by the pressing force exerted by the coil spring 1660. When the steel ball 1680 comes into contact with the window frame of the window portion 1760, a slight vibration is generated with a click sound of "click", and the vibration is transmitted to the operator 133 through his left foot operating the gear change pedal 18.

In other words, with the steel ball 1680 released from the window portion 1760 and thereafter again engaged with the window portion 1760 in response to the operation of the gear change pedal 18, the slight vibration is generated with the click sound of "click", thereby permitting the operator 133 to get a click feeling similar to that at the time of a gear change in an actual motorcycle.

Thus, according to the present embodiment, the click generating means 1501 for generating a pseudo-click feeling at the time of a gear change is constituted of a simple mechanism comprising the steel ball 1680, the coil spring 1660 and the like, whereby the click generating means 1501 can be manufactured inexpensively, without using a complicate mechanism such as a dummy motorcycle model, for example.

In addition, the operator 133 can get an operating feeling similar to that at an actual gear change, from the click sound and the vibration which are generated by the click generating means 1501, and the operating feeling can be made to be more similar to that at a gear change in an actual motorcycle.

Referring to FIGS. 18-21, the dummy steering simulation aspects of the present invention will be described.

Figure 18:
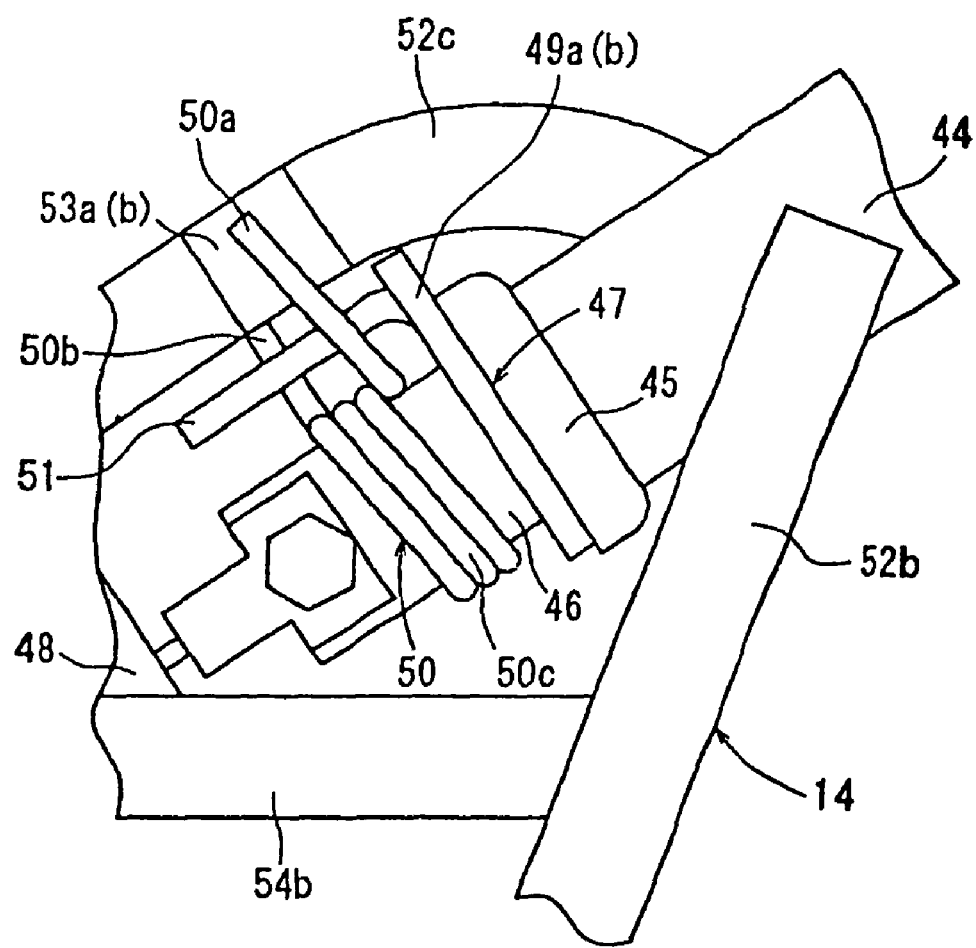
FIG. 18 is a partly omitted side view showing a stopper member provided at one end portion of a stem member and a return spring.

As shown in FIG. 18, at one end portion of the stem member 46 close to the bracket 48, there are provided a cap member 45 mounted to the outer circumferential surface of the stem member 46, a stopper member 47 fixed to the outer circumferential surface of the stem member 46 so as to restrict the turning angle of the steering handle 28, and a single return spring (spring) 50 which generates a force (reaction force) in a direction opposite to the turning direction of the steering handle 28 when the steering handle 28 is turned leftwards or rightwards with the stem member 46 as a turning shaft and which holds the steering handle 28 in a center position.

Figure 19:
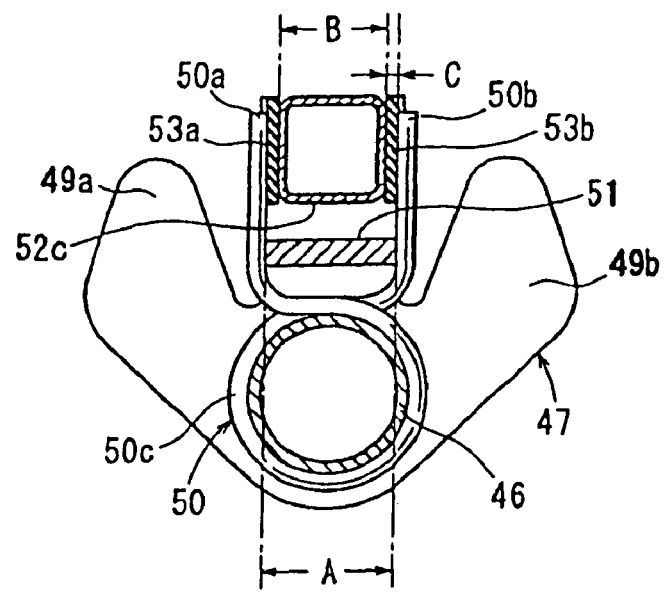
FIG. 19 is a partly sectional view showing the relationship in which a third main frame is clamped between end portions of the return spring.

As shown in FIG. 19, the stopper member 47 comprises a pair of locking pieces 49a and 49b provided so as to turn integrally with the stem member 46 upon an operation on the steering handle 28 and projected radially outwards, and a projection piece 51 which is provided between the pair of locking pieces 49a and 49b and which extends roughly in parallel with the axis of the stem member 46 to be engaged with both end portions 50a and 50b of the return spring 50.

When the steering handle 28 is operated and the stem member 46 and the stopper member 47 are rotated as one body, one or the other locking piece 49a (49b) abuts against an elastic member 53a (53b) attached (adhered) to one of both opposed side surfaces of a third main frame (frame portion) 52c described later, whereby the operating angle of the steering handle 28 is restricted.

The elastic members 53a and 53b are formed of a rubber or the like. The thickness C of the elastic members 53a and 53b is set to be greater than (A−B)/2, where A is the inside width between both end portions 50a and 50b of the return spring 50 which are roughly parallel to each other and spaced from each other, and B is the outside width of the third main frame 52c formed in a rectangular shape in section. This makes it possible to eliminate gaps between the end portions 50a and 50b of the return spring 50 and outside wall surfaces of the third main frame 52c.

The return spring 50 is comprised of an annular portion 50c wound along the outer circumferential surface of the cylindrical stem portion 46, and a pair of the end portions 50a and 50b which project from the annular portion 50c in outward directions (directions roughly orthogonal to the axis of the stem member 46) and which clamp the third main frame 52c therebetween through the pair of elastic members 53a and 53b attached to both side surfaces of the third main frame 52c.

Incidentally, the pair of end portions 50a and 50b function as a clamping portion.

Figure 20:
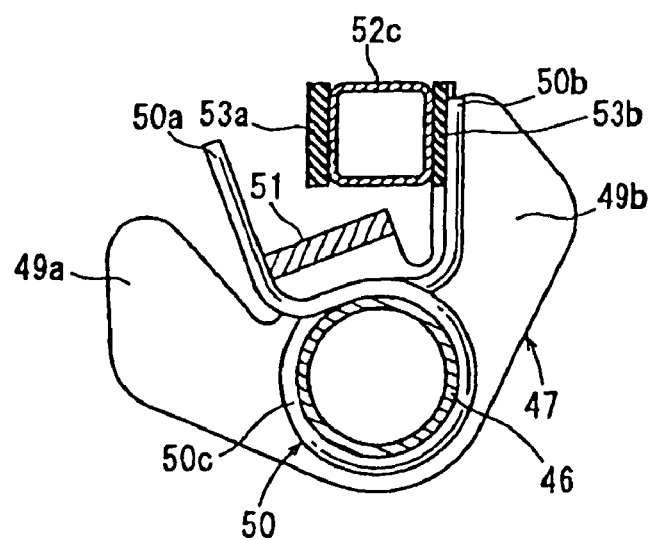
FIG. 20 is a partly sectional view showing the condition where the stopper member shown in FIG. 19 is turned counterclockwise and a projection piece presses the end portion of the return spring along the turning direction.
Figure 21:
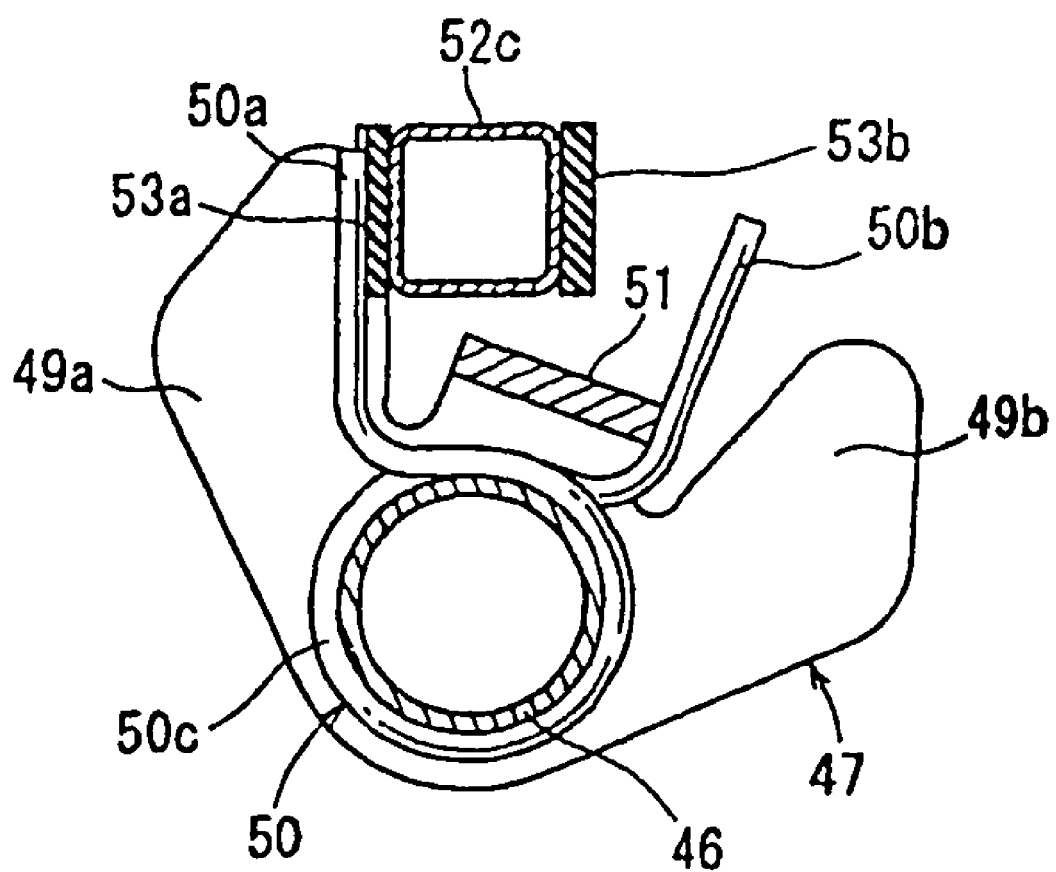
FIG. 21 is a partly sectional view showing the condition where the stopper member shown in FIG. 19 is turned clockwise and the projection piece presses the end portion of the return spring along the turning direction.

In this case, the projection piece 51 of the stopper member 47 is provided between the pair of end portions 50a and 50b of the return spring 50, and the stopper member 47 is turned as one body with the stem member 46 upon an operation on the steering handle 28, whereby it is ensured that the projection piece 51 presses one or the other end portion 50a (50b) of the return spring 50 along the turning direction (see FIGS. 20 and 21). Therefore, a returning force of the return spring 50 thus pressed generates a reaction force for urging the steering handle 28 in a direction opposite to the turning direction.

In addition, the pair of end portions 50a and 50b of the return spring 50 are provided so as to clamp the third main frame 52c therebetween through the pair of elastic members 53a and 53b, in a normal condition, so that a force for urging the steering handle 28 toward the center position is normally acting.

In this embodiment of the steering simulation, when the steering handle 28 is turned leftwards or rightwards, the projection piece 51 of the stopper member 47 turned as one body with the stem member 46 presses the end portions 50a and 50b of the return spring 50 in the turning direction, whereby reaction forces in the leftward and rightward directions are generated by the springy force of the return spring 50.

As for example shown in FIG. 20, where the stem member 46 and the stopper member 47 are integrally turned counterclockwise, one end portion 50a of the return spring 50 is pressed by the projection piece 51 in the turning direction, whereby a clockwise reaction force is applied to the steering handle 28 through the return spring 50. In this case, the other end portion 50b of the return spring 50 is engaged and stopped by the elastic member 53b of the third main frame 52c.

FIG. 21 shows the case where the stem member 46 and the stopper member 47 are integrally turned clockwise, upon which a counterclockwise reaction force is applied to the steering handle 28.

Thus, in the present embodiment of the steering simulation, the return spring 50 is mounted in the state of being wound around the outer circumferential surface of the stem member 46, and is so provided as to clamp the central third main frame 52c between both its end portions 50a and 50b projecting outwards, whereby reaction forces in directions opposite to the turning directions can be applied to the steering handle 28 turned in leftward and rightward directions, by the single return spring 50.

Furthermore, with the steering simulation provided in this embodiment, the elastic members 53a and 53b are interposed between the third main frame 52c and the end portions 50a and 50b of the return spring 50, whereby generation of gaps between the outside wall surfaces of the third main frame 52c and the end portions 50a and 50b of the return spring 50 is obviated, and generation of a chatter at the steering handle 28 due to such gaps can be prevented.

EFFECTS OF THE INVENTION

With the present invention, numerous beneficial effects can be obtained, including the following.

According to the first aspect of present invention, when the riding simulation system is installed, the operator can always operate stably the brake pedal and the gear change pedal, by extending or contracting the connection shaft in the condition where the steering handle mechanism or the step mechanism is supported by the support means.

In addition, with the connection shaft provided to be inclinable relative to the steering handle mechanism or the step mechanism, the operator can get pseudo-experiences of running conditions of various vehicle forms of motorcycles differing in the position of the step mechanism relative to the position of the steering handle mechanism.

According to the second aspect of the present invention, the vibrator is mounted in the steering handle pipe having the taper surface portion through the brackets having outer circumferential surfaces gradually decreasing in diameter. In this case, the steering handle pipe and the brackets are securely connected to each other through the taper surface portion, so that the vibration produced by the vibrator is accurately transmitted to the exterior. This permits the operator to experience a dummy vibration with a high ambience.

In addition, owing to the structure in which the engaging portions at the end portions of the brackets are engaged with the end portion of the steering handle pipe, the trouble in which the brackets are inserted excessively into the steering handle pipe to be difficult to remove can be obviated, and there is no need for a special engaging means. Therefore, the brackets are easy to attach and detach, and the number of component parts can be reduced to a required minimum number.

Besides, where the vibrator is fixed to the steering handle pipe by screw-engaging the bracket having the engaging portion to the steering handle pipe by use of screws, the same effects as above can be obtained.

Furthermore, where the vibrator is inserted and held in the inside of one end portion of the steering handle pipe and a gap is formed between the outer circumferential portion of the one end portion and the steering handle grip, the gap between the steering handle pipe and the steering handle grip prevents the vibration from being attenuated, so that the vibration is efficiently transmitted to both end portions of the steering handle pipe, and the operator can experience a good dummy vibration. Incidentally, where the steering handle grip is a throttle grip, the gap can be easily formed. Besides, with the steering handle pipe composed of a single pipe, the dummy vibration can be transmitted more favorably.

According to the third aspect of the present invention, with the click sound, for example, a "click", and a vibration similar to that upon an actual gear change generated by the click generating means composed of a simple mechanism, the operating feeling upon a gear change in the riding simulation system can be made to be more similar to that upon a gear change in an actual motorcycle.

According to the fourth aspect of the present invention, reaction forces in directions opposite to the turning directions are applied to the steering handle by the single spring, whereby generation of chatter at the steering handle is obviated, and the reaction forces can be generated with a simple mechanism.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A riding simulation system for providing an operator with a pseudo-experience of running conditions of a motorcycle by displaying scenery seen to the rider as a video image on a display based on the operating condition of operation by the operator, said riding simulation system comprising:
    a steering handle mechanism gripped and operated by the operator;
    a step mechanism comprising a brake pedal and a gear change pedal which are operated by the feet of the operator;
    a connection shaft for connecting said steering handle mechanism and said step mechanism to each other, said connection shaft provided to be extendable and contractible along the axial direction thereof; and
    a frame body having:
        a cylindrical portion, and
        at least two main frames having upper portions that are directly attached to the cylindrical portion and lower portions that are connected via a connection frame, the at least two main frames having curved shapes,
        wherein all portions of the at least two main frames are disposed forwardly with respect to the steering handle mechanism,
    wherein said steering handle mechanism is mounted at an upper portion of the cylindrical portion, and the connection shaft is disposed midway along the connection frame which extends orthogonally with respect to the lower portions of the at least two main frames,
    further comprising a vibrator for a dummy engine vibration,
    a taper surface portion formed at an inner circumferential surface of a steering handle pipe constituting said steering handle mechanism, said taper surface portion gradually decreasing in diameter from the side of an end portion of said steering handle pipe; and
    a bracket having an engaging portion for engagement with said end portion of said steering handle pipe, having an outer circumferential surface gradually decreasing in diameter from the side of said engaging portion, and being inserted into said taper surface portion while holding said vibrator;
    wherein the bracket includes a pair of brackets,
    wherein each of the brackets includes a recess on an inner surface thereof, and when the brackets are mated together, the recesses of the mating brackets form a space in which the vibrator is disposed wherein recesses have flat inner faces that oppose each other for engaging with left and right flat sides of the vibrator.

2. The riding simulation system as set forth in claim 1, wherein said connection shaft is provided to be inclinable relative to each of said main two frames, and to said steering handle mechanism or said step mechanism.

3. The riding simulation system as set forth in claim 1, further comprising means for giving a reaction force in a direction opposite to a turning direction of said steering handle mechanism.

4. The riding simulation system as set forth in claim 1, further comprising:
    a bracket having a hollow space, the bracket being screw-engaged with an end portion of a steering handle pipe constituting said steering handle mechanism, wherein said vibrator is inserted into the inside of said steering handle pipe in the state of being held by said bracket, wherein the vibrator includes an eccentrically mounted weight extending from an outer end of the vibrator so as to be disposed in the hollow space.

5. The riding simulation system as set forth in claim 3, further comprising:

a single spring for giving a reaction force in a direction opposite to the turning direction of said steering handle when said steering handle is operated, wherein said single spring is provided with a pair of clamping portions projected outwards from said steering handle shaft portion so as to clamp external surfaces of one of the at least two main frames therebetween.

6. A riding simulation system for providing an operator with a pseudo-experience of a running condition of a motorcycle by generating a dummy engine vibration based on the operating condition by the operator, said riding simulation system comprising:

a vibrator for the dummy engine vibration in a steering handle mechanism, the vibrator formed with left and right flat sides and curved top and bottom sides, and including an eccentrically mounted weight mounted on a rotatable shaft of a motor of the vibrator extending from an outer end of the vibrator, so that when the rotatable shaft of the motor is rotated, the eccentrically mounted weight causes the dummy engine vibration;

a taper surface portion formed at an inner circumferential surface of a steering handle pipe constituting said steering handle mechanism, said taper surface portion gradually decreasing in diameter from the side of an end portion of said steering handle pipe; and a bracket having an engaging portion for engagement with said end portion of said steering handle pipe, having an outer circumferential surface gradually decreasing in diameter from the side of said engaging portion, and being inserted into said taper surface portion while holding said vibrator, wherein the bracket includes a pair of brackets, wherein each of the brackets includes a recess on an inner surface thereof, and when the brackets are mated directly together, the recesses of the mating brackets form a space in which the vibrator is disposed in a manner such that an axis of the rotatable shaft is maintained in fixed position with respect to the recesses of the brackets, wherein the recesses of the brackets have flat rectangular-shaped inner faces that oppose each other for receiving the left and right flat sides of the vibrator, and the eccentrically mounted weight is disposed in a portion of the brackets that is separate from each of the recesses.

7. The riding simulation system as set forth in claim 6, further comprising:

a step mechanism comprising a brake pedal and a gear change pedal which are operated by the feet of the operator;

a connection shaft for connecting said steering handle mechanism and said step mechanism to each other, said connection shaft provided to be extendable and contractible along the axial direction thereof; and a frame body having a cylinder portion and at least two main frames, wherein said steering handle mechanism is supported by the cylinder portion and the connection shaft is disposed midway between and is supported by lower portions of two of the first to third main frames.

8. A riding simulation system comprising a vibrator for a dummy engine vibration in a steering handle mechanism and providing an operator with a pseudo-experience of a running condition of a motorcycle by generating the dummy engine vibration based on the operating condition by the operator, said riding simulation system comprising:

a bracket having a hollow space, the bracket being screw-engaged with an end portion of a steering handle pipe constituting said steering handle mechanism, wherein said vibrator is inserted into an inside of said steering handle pipe in a state of being held by said bracket, wherein the vibrator is formed with two parallel flat sides and curved top and bottom sides, wherein a first portion of the hollow space is enclosed and includes two flat rectangular-shaped inner faces that are parallel to each other for receiving the two parallel flat sides of the vibrator in a manner such that an axis of a rotatable shaft of a motor of the vibrator is maintained in fixed position with respect to the two flat rectangular-shaped inner faces of the first portion of the hollow space, wherein the vibrator includes an eccentrically mounted weight mounted on the rotatable shaft of the motor, the motor extending from an outer end of the vibrator so as to be disposed in a second portion of the hollow space that is separate from the first portion, and wherein when the rotatable shaft of the motor is rotated, the eccentrically mounted weight causes the dummy engine vibration.

9. A riding simulation system comprising:

a vibrator for a dummy engine vibration in a steering handle mechanism and providing an operator with a pseudo-experience of a running condition of a motorcycle by generating the dummy engine vibration based on the operating condition by the operator, the vibrator including an eccentric cam attached to a rotatable shaft of a motor of the vibrator, so that when the rotatable shaft of the motor is rotated, the eccentrically mounted weight causes the dummy engine vibration, a bracket into which said vibrator is inserted, the bracket being held in an inside of one end portion of a steering handle pipe constituting said steering handle mechanism, and a predetermined gap is formed between an outer circumferential portion of said one end portion of said steering handle pipe and a steering handle grip attached to said outer circumferential portion, the bracket including a pair of brackets, each of the brackets including a recess on an inner surface thereof, and when the brackets are mated directly together, the recesses of the mating brackets form an enclosed space in which the vibrator is disposed in a manner such that an axis of the rotatable shaft is maintained in fixed position with respect to the recesses of the brackets, and wherein the vibrator is formed with left and right flat sides and curved top and bottom sides, wherein the recesses of the brackets have flat, rectangular-shaped inner faces opposing each other for receiving the left and right flat sides of the vibrator, the eccentric cam being disposed in a portion of the brackets that is separate from each of the recesses.

10. The riding simulation system as set forth in claim 9, wherein said steering handle grip is a throttle grip.

11. The riding simulation system as set forth in claim 9, wherein said steering handle pipe is comprised of a single pipe communicating one end portion, on which said throttle grip is mounted, and the other end portion to each other.

12. The riding simulation system as set forth in claim 10, wherein said steering handle pipe is comprised of a single pipe communicating one end portion, on which said throttle grip is mounted, and the other end portion to each other.

13. A riding simulation system for providing an operator with a pseudo-experience of running conditions of a motorcycle by displaying scenery seen to the rider as a video image on a display based on an operating condition upon an operation by the operator and detecting a gear change by a sensor provided at a gear change pedal, said riding simulation system comprising:

a step mechanism which is operated by a foot of the operator;

a connection shaft for connecting said handle mechanism and said step mechanism to each other, a frame portion including a cylindrical portion into which a handle shaft portion of the handle mechanism is inserted, and at least two curved main frames directly connected to the cylindrical portion, the at least two curved main frames being connected via a connection frame extending laterally between lower portions of the two main frames, and the connection shaft is mounted along a central portion of the connection frame which extends orthogonally with respect to the lower portions of the two main frames, and further comprising:

a click generator adapted to generate a click feeling similar to a gear change in an actual motorcycle when a gear change is made by operating said gear change pedal, wherein the click generator comprises a support member disposed between a cover member and a support plate, and a ball member disposed in a hole formed in a shaft projecting from a support member, the cover member having a hole portion formed therein in which the ball member is engaged when said gear change pedal is in a center position.

14. The riding simulation system as set forth in claim 13, when said gear change is made by operating said gear change pedal, said ball member is released from said hole portion and thereafter again engaged in said hole portion, whereby a click sound and a vibration are generated.

15. The riding simulation system as set forth in claim 13, wherein the click generator is part of the step mechanism which includes a gear change pedal unit, the gear change pedal unit also including a step adapted to accommodate the foot of the operator, the step and the gear change pedal being disposed on one side of a mount plate, and the shaft accommodating the ball member being disposed on an opposite side of the mount plate.

16. A riding simulation system for providing an operator with a pseudo-experience of running conditions of a motorcycle by displaying scenery seen to the rider as a video image on a display based on an operating condition of a dummy operating mechanism operated by the operator, said riding simulation system comprising:

a handle mechanism for operating a steering handle with a handle shaft portion as a turning fulcrum by said operator, a step mechanism which is operated by the feet of the operator;

a connection shaft for connecting said handle mechanism and said step mechanism to each other, a frame portion including a cylindrical portion into which the handle shaft portion is inserted, and first to third main frames directly connected at equal angular intervals to upper left, right, and front sides of the cylindrical portion, the first to third main frames being adapted to support said steering handle shaft portion, and a single spring for giving a reaction force in a direction opposite to the turning direction of said steering handle when said steering handle is operated, wherein said single spring is provided with a pair of clamping portions projected outwards from said steering handle shaft portion so as to clamp external surfaces of one of the main frames therebetween, wherein all portions of the first to third main frames are disposed forwardly with respect to the steering handle mechanism, and the first and second main frames are connected via a connection frame which extends orthogonally with respect to lower portions of the first and second main frames, wherein the connection shaft is mounted along a central portion of the connection frame extending between the lower portions of the at first and second main frames further comprising a vibrator for a dummy engine vibration, a taper surface portion formed at an inner circumferential surface of a steering handle pipe constituting said steering handle mechanism, said taper surface portion gradually decreasing in diameter from the side of an end portion of said steering handle pipe; and a bracket having an engaging portion for engagement with said end portion of said steering handle pipe, having an outer circumferential surface gradually decreasing in diameter from the side of said engaging portion, and being inserted into said taper surface portion while holding said vibrator;

wherein the bracket includes a pair of brackets, wherein each of the brackets includes a recess on an inner surface thereof, and when the brackets are mated together, the recesses of the mating brackets form a space in which the vibrator is disposed wherein recesses have flat inner faces that oppose each other for engaging with left and right flat sides of the vibrator.

17. The riding simulation system as set forth in claim 16, wherein elastic members are interposed between said pair of clamping portions of said spring and said frame.

18. The riding simulation system as set forth in claim 16, wherein the step mechanism comprises a brake pedal and a gear change pedal which are operated by the feet of the operator;

said connection shaft is provided to be extendable and contractable along the axial direction thereof; and wherein the connection shaft is inclinable by a predetermined amount relative to each of the first to third main frames.

* * * * *